United States Patent
Boyd et al.

(10) Patent No.: US 7,798,798 B2
(45) Date of Patent: Sep. 21, 2010

(54) ROTARY INJECTION MOLDING APPARATUS AND METHOD FOR USE

(75) Inventors: Kathleen C. Boyd, Akron, OH (US); Thomas J. Boyd, Akron, OH (US)

(73) Assignee: VMI Holland B.V., Epe (NL)

( * ) Notice: Subject to any disclaimer, the term of this patent is extended or adjusted under 35 U.S.C. 154(b) by 145 days.

(21) Appl. No.: 11/781,933

(22) Filed: Jul. 23, 2007

(65) Prior Publication Data

US 2008/0174048 A1 Jul. 24, 2008

Related U.S. Application Data

(63) Continuation of application No. 10/803,522, filed on Mar. 17, 2004, now abandoned.

(60) Provisional application No. 60/455,275, filed on Mar. 17, 2003.

(51) Int. Cl.
*B29C 45/14* (2006.01)
*B29C 45/06* (2006.01)
*B29C 45/42* (2006.01)

(52) U.S. Cl. .................. 425/126.1; 425/129.1; 425/185; 425/186; 425/190; 425/556; 425/576

(58) Field of Classification Search .............. 425/126.1, 425/163, 185, 186, 190, 192 R, 556, 576, 425/129.1
See application file for complete search history.

(56) References Cited

U.S. PATENT DOCUMENTS

| | | | |
|---|---|---|---|
| 3,489,608 A | * | 1/1970 | Jacobs et al. ............... 134/25.4 |
| 3,621,533 A | * | 11/1971 | Bertrandi ................ 425/192 R |
| 5,183,605 A | | 2/1993 | Brown et al. |
| 5,209,889 A | | 5/1993 | Brown et al. |
| 5,256,056 A | | 10/1993 | Brown et al. |
| 5,275,547 A | | 1/1994 | Brown |
| 5,275,664 A | | 1/1994 | Brown et al. |
| 5,286,186 A | | 2/1994 | Brown et al. |
| 5,302,103 A | | 4/1994 | Brown et al. |
| 5,318,435 A | | 6/1994 | Brown et al. |
| 5,358,398 A | | 10/1994 | Brown et al. |
| 5,431,307 A | | 7/1995 | Brown et al. |
| 5,449,282 A | | 9/1995 | Brown et al. |
| 5,580,584 A | | 12/1996 | Mussler et al. |
| 5,609,275 A | | 3/1997 | Brown et al. |
| 5,611,975 A | | 3/1997 | Kamiguchi et al. |
| 5,622,736 A | | 4/1997 | Brown et al. |

(Continued)

FOREIGN PATENT DOCUMENTS

| | | | |
|---|---|---|---|
| FR | 1496206 A | * | 9/1967 |
| JP | 03034806 A | * | 2/1991 |
| JP | 05138683 A | * | 6/1993 |
| JP | 07223235 A | * | 8/1995 |

*Primary Examiner*—Robert B Davis

(57) ABSTRACT

A rotary injection molding apparatus and method for manufacturing products containing elastomeric material within multi-section single cavity molds. The apparatus includes a modular frame supporting an injection molding operation station having an injector assembly with a pressure sensitive nozzle assembly. The injector assembly is engaged with an extruder assembly at a check valve assembly. A mold servicer assembly is provided for assembly and disassembly of multi-section single cavity molds. A robotic arm assembly is supported on the modular frame and positioned for inserting and removing products or product components from disassembled molds. Finally; a rotating table is provided on the frame which has a plurality of work station positions supporting clamping assemblies for clamping single cavity molds around the periphery of the rotating table.

11 Claims, 22 Drawing Sheets

U.S. PATENT DOCUMENTS

| | | |
|---|---|---|
| 5,640,756 A | 6/1997 | Brown et al. |
| 5,643,614 A | 7/1997 | Brown et al. |
| 5,830,390 A | 11/1998 | Brown et al. |
| 5,843,487 A | 12/1998 | Boyd et al. |
| 5,975,872 A * | 11/1999 | Raines et al. ............... 425/136 |
| 6,023,829 A | 2/2000 | Boyd et al. |
| 6,106,275 A | 8/2000 | Huff et al. |
| 6,275,741 B1 | 8/2001 | Choi |
| 6,572,362 B2 | 6/2003 | Boyd |
| 6,604,936 B2 | 8/2003 | Boyd |
| 6,637,496 B1 * | 10/2003 | Macheske et al. ........... 164/119 |
| 2003/0213560 A1 * | 11/2003 | Wang et al. ............ 156/345.31 |

\* cited by examiner

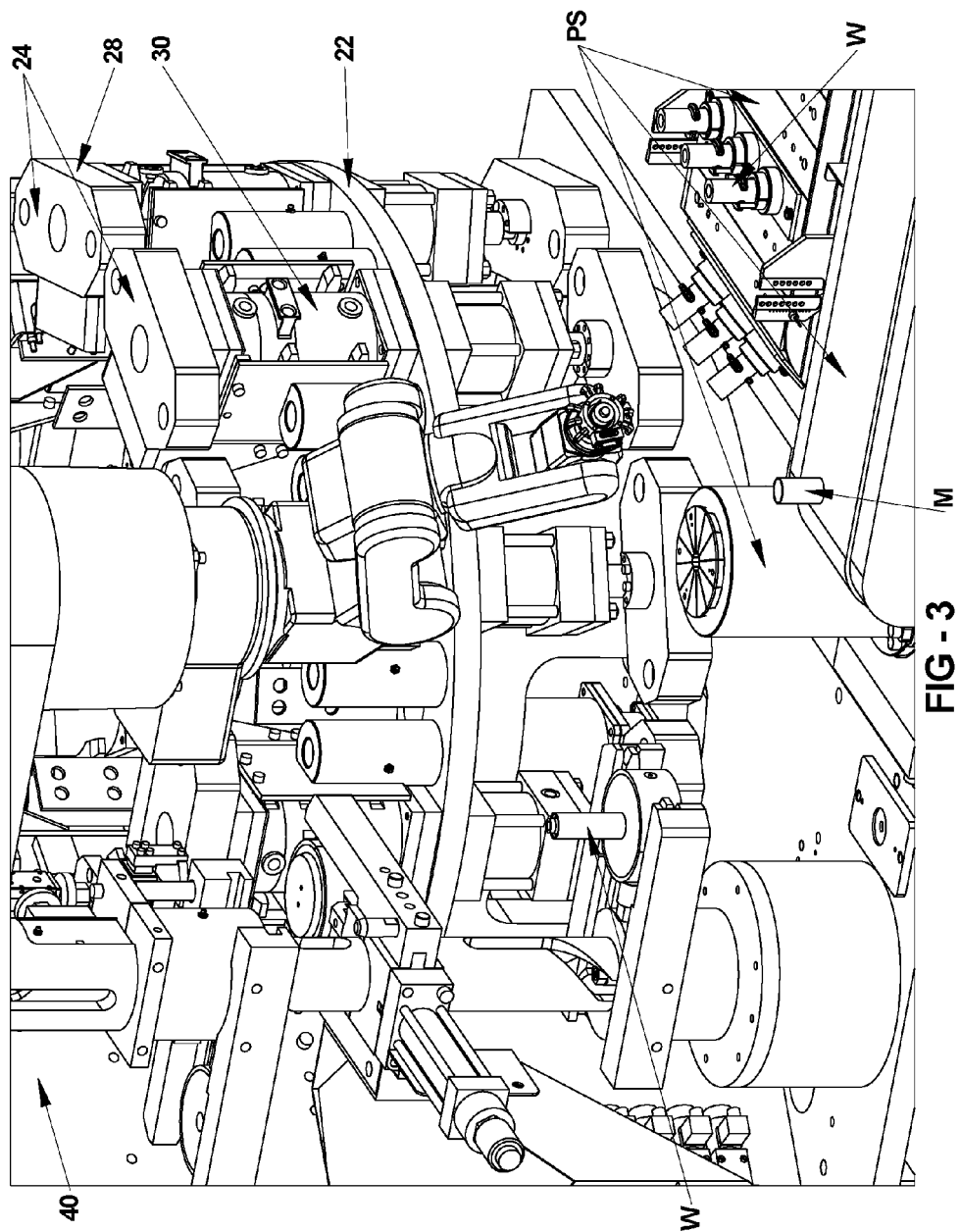

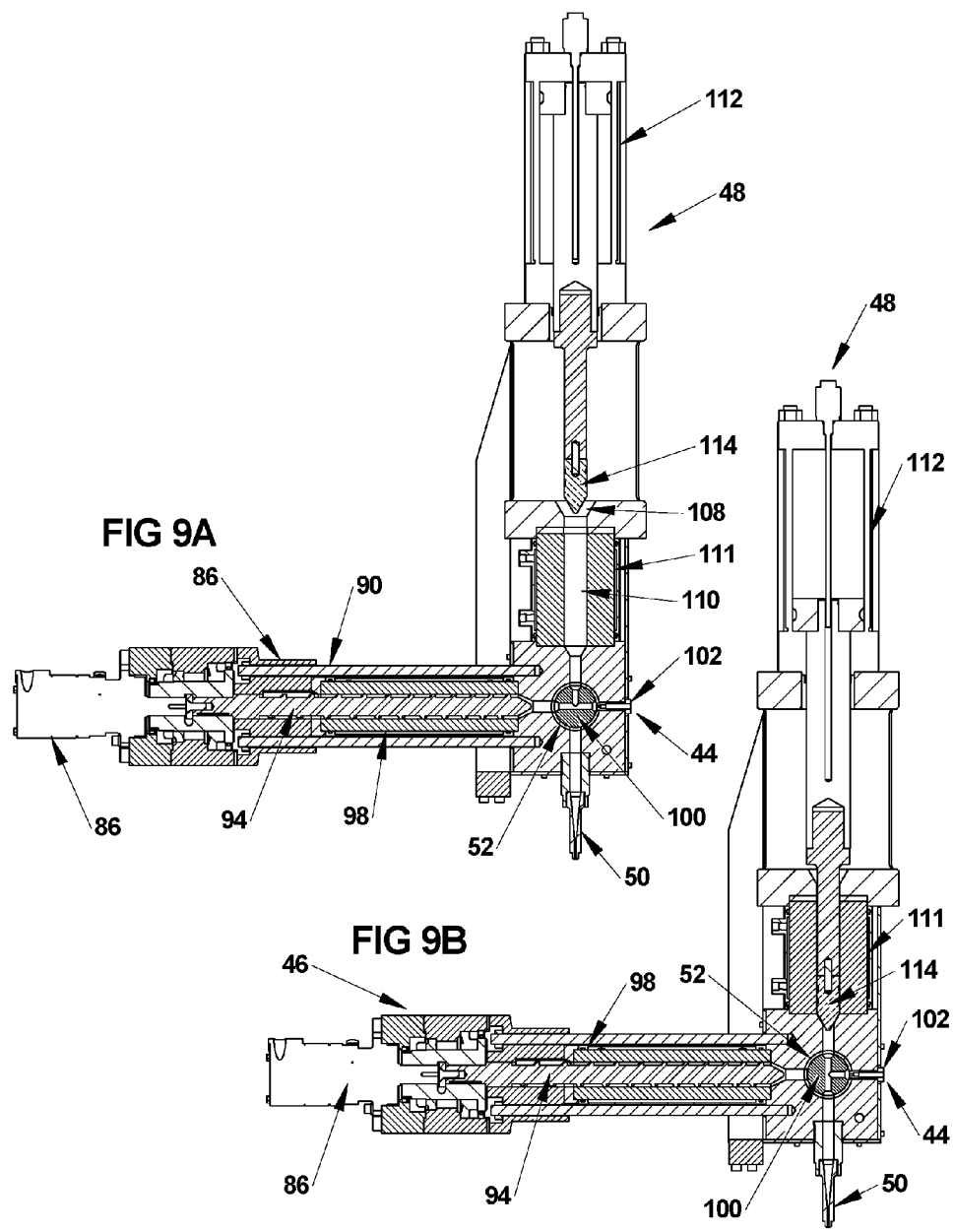

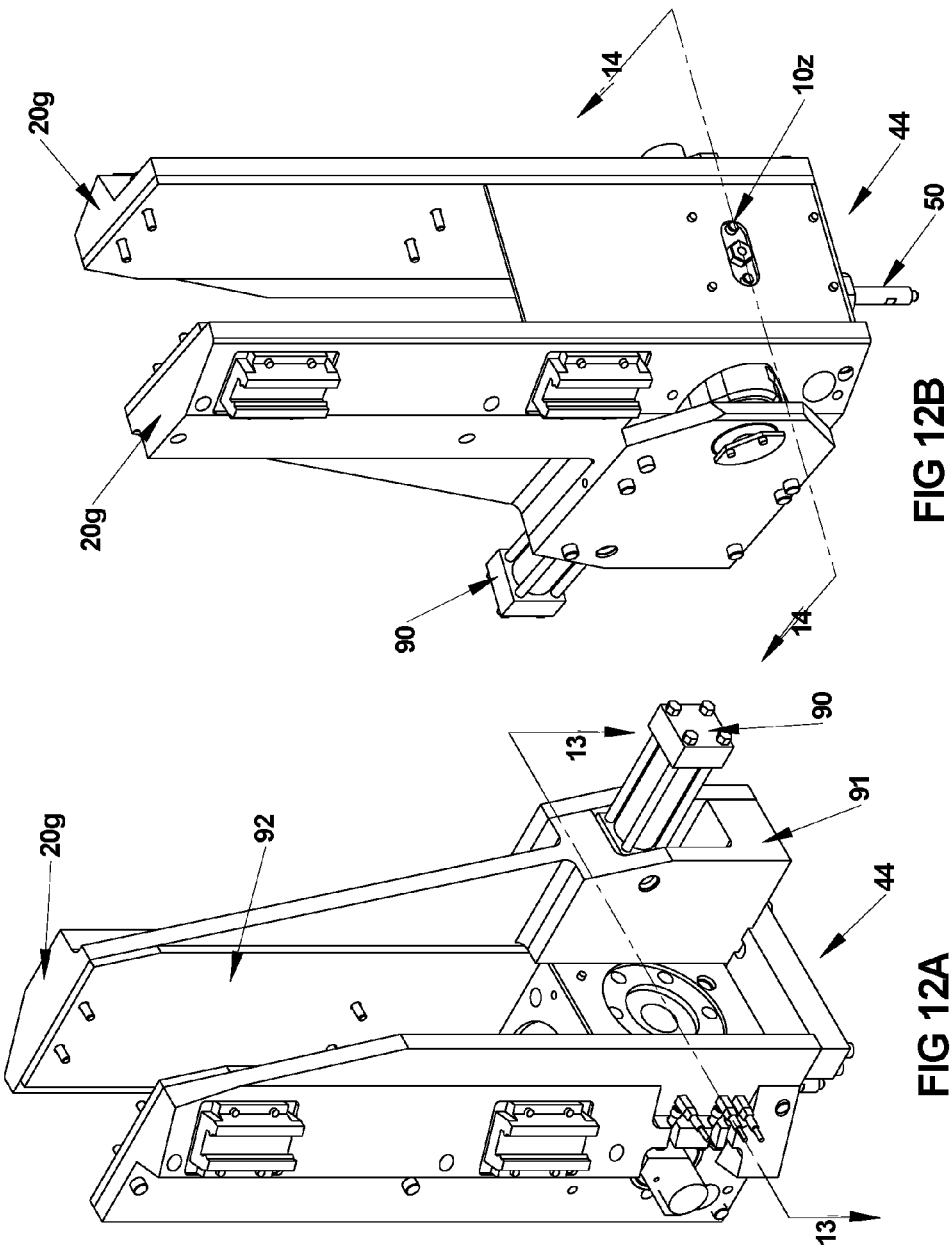

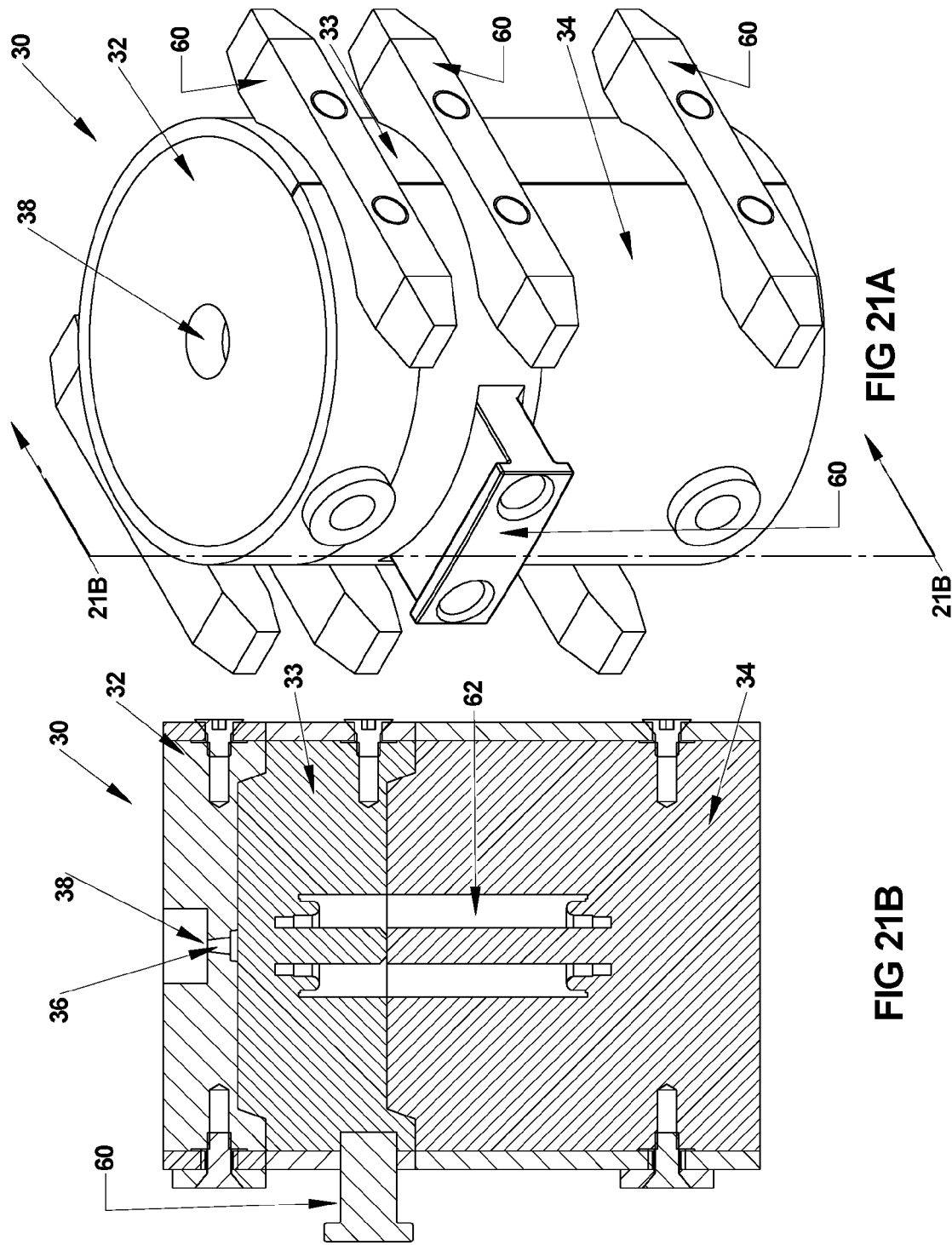

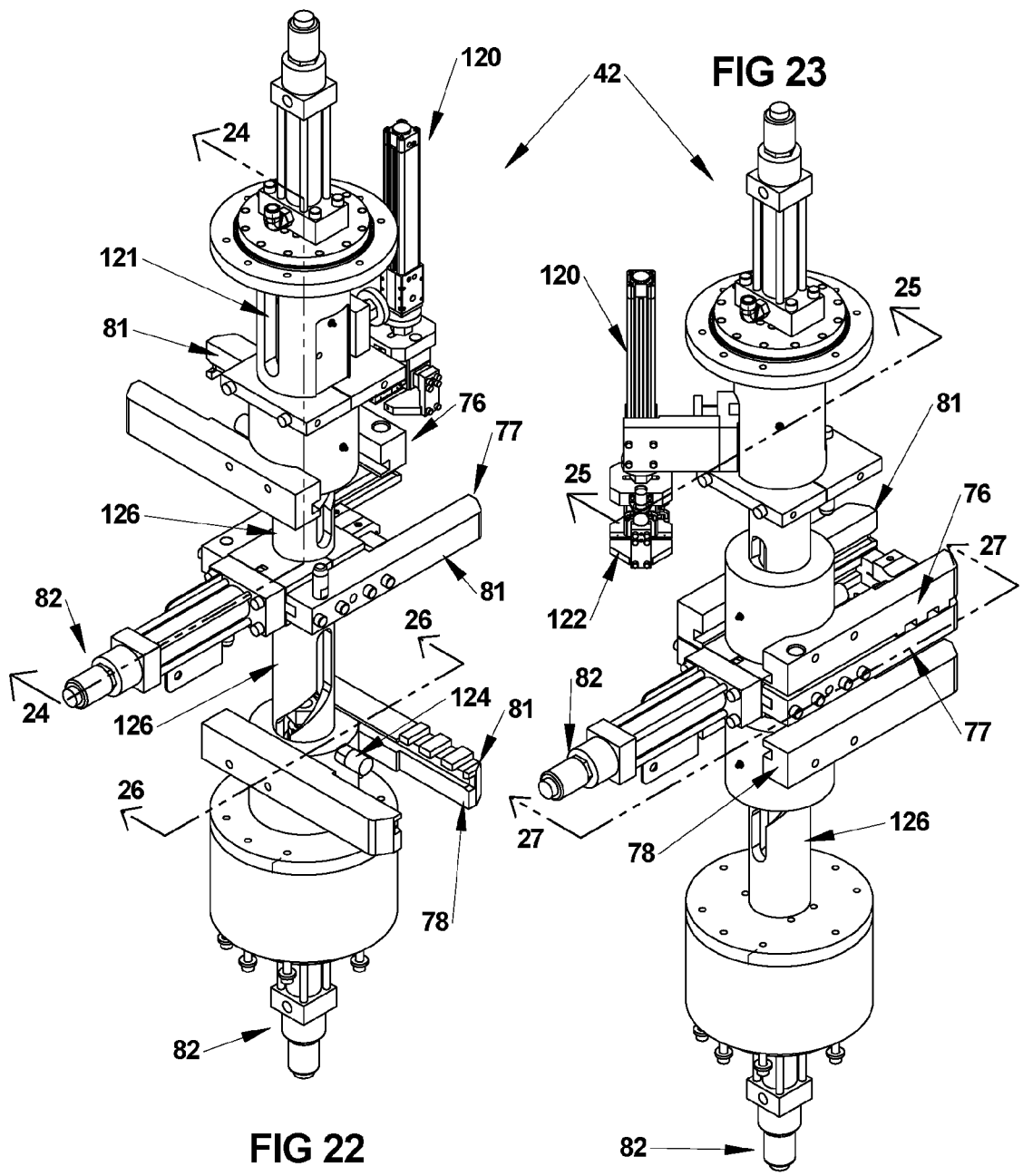

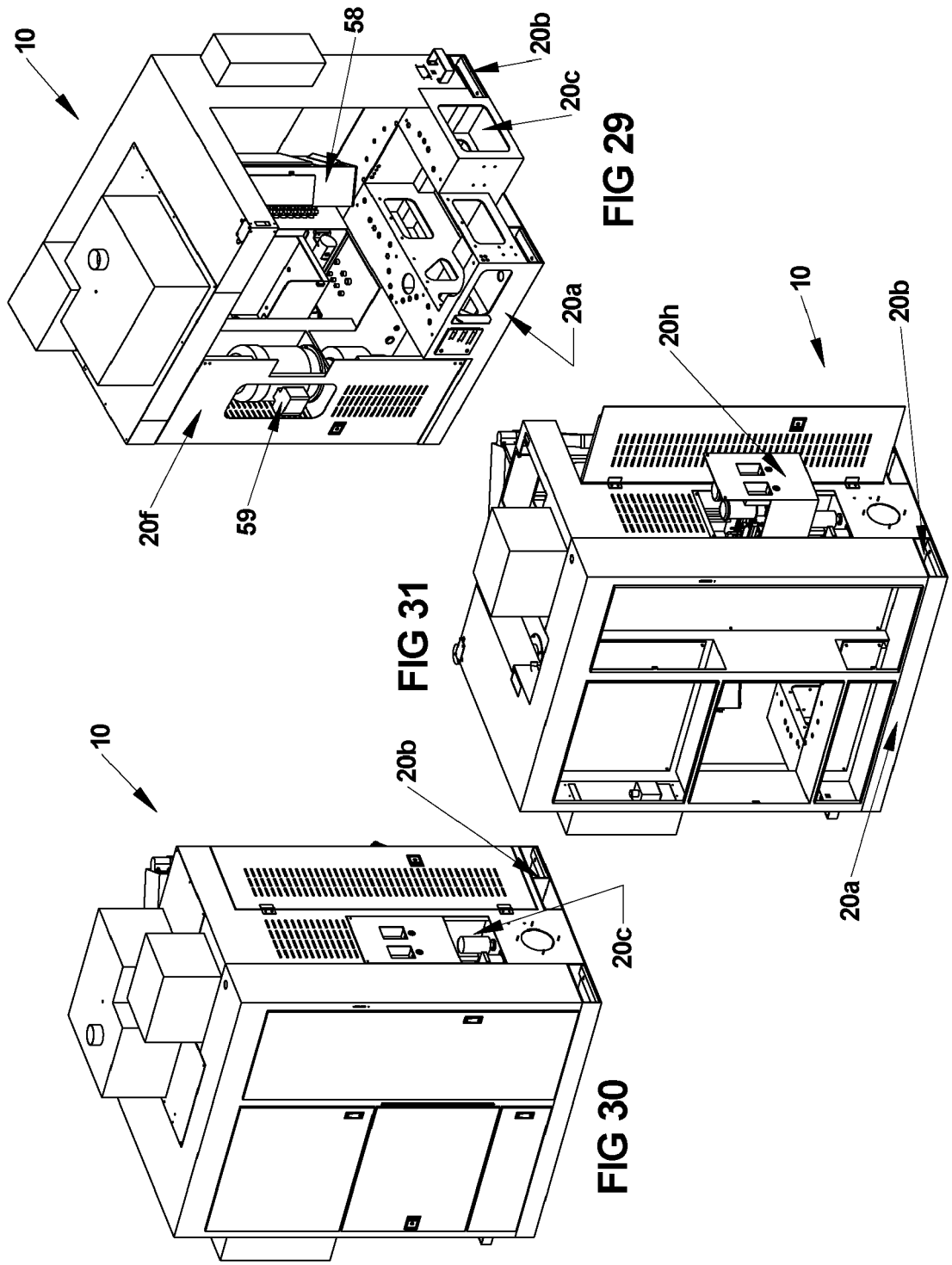

ROTARY INJECTION MOLDING APPARATUS AND METHOD FOR USE

CROSS-REFERENCE TO RELATED APPLICATIONS

The present application claims priority from U.S. patent application Ser. No. 60/455,275 filed Mar. 17, 2003, the entire subject matter of which is incorporated herein by reference.

BACKGROUND OF THE INVENTION

1. Field of Invention

The present invention relates to invention molding machines and more specifically to a rotary injection molding apparatus and method for its use.

2. Background of the Related Art

Injection molding machines are commonly used in the manufacturing industry for molding elastomeric materials such as rubber, plastic or combinations of these materials. For example, current vibration control components for the automotive industry are produced using large injection press machinery with multi-cavity molds. Multi-cavity molds produce large amounts of natural rubber waste from the large runner-system, cavity flash, and damaged cavities. The time and cost to engineer and manufacture these intricate molds and their associated tooling is very high. Product quality and consistency is also compromised due to the variation in cavity pressures and temperature.

The multi-cavity mold style of molding also requires extensive operator intervention, which can lead to operator error and operator injuries due to the hazards associated with the large, heavy, hot molds. Automating high-cavity molds is clumsy, expensive and often unsuccessful. The multi-cavity systems almost always require secondary finishing operations, which cost the plant time and money.

Additionally, in prior art multi-cavity mold systems, performing tasks such as mold changes for different parts required the use of heavy lifting equipment. Also, moving the press to another location is not easily done since many of these large presses require a large floor pit.

Prior examples of injection molding machine solutions which avoid the use of multi-cavity molds are disclosed in U.S. Pat. Nos. 6,604,936 and 5,843,487. The components of prior single mold injection molding systems typically include a stock supply assembly, an extruder assembly, an injection assembly, a mold and a clamping assembly. In a typical molding process, the stock supply assembly supplies a certain amount of stock material to the extruder assembly. The extruder assembly processes or plasticizes the stock material into injection material, and conveys the desired amount of material to the injection assembly. Upon clamping of the mold within the clamping assembly under the force necessary for successful molding, the injection assembly injects the injection material into a mold cavity within the mold. When a metal insert or other mold component is required in the molding procedure using an injection molding machine, sections or portions of the mold must initially be separated and an unfinished component, insert or work piece loaded into one of the mold sections. The mold sections are then assembled to form the internal mold cavity.

Once the mold cavity is formed, the mold is clamped under the necessary force to hold the unfinished inserts, components or work pieces in position during operation of the injection assembly, which injects the elastomeric molding material into the mold cavity. The mold sections are then opened or removed and the molded product having the previously unfinished, now molded part and insert or joined work pieces, are unloaded from the mold cavity. However, none of these prior solutions provides the advantages of a rotary injection molding system.

SUMMARY OF THE INVENTION

The present invention provides a safe, simple and more efficient injection molding apparatus and method for injection molding elastomeric products by using multiple single cavity molds which are rotated into and out of operation on a rotating table. By using single cavity molds, all the disadvantages of the multi-cavity system method are eliminated or reduced.

Advantages of the use of single cavity molds over multi-cavity mold systems include that they have little or no runner system, so natural waste is dramatically reduced. Cavity flash can be minimized or eliminated by accurate and precise control of cavity fill pressures and concentrated clamp forces at the surfaces adjacent to the cavity. Secondary trimming operations for flash removal, or other finishing operations, may also be eliminated or reduced. Single cavity molds can be designed and fabricated in a fraction of the time it takes to design and manufacture a multi-cavity mold. Also, changes to the single cavity molds can be implemented rapidly, leading to shorter product-to-market time. The smaller mold size also allows for easy mold change capability, as well as easier and less dangerous handling by operators.

While prior single cavity systems of injection molding have been used, the present application provides numerous improvements over such prior systems. The automated rotary injection apparatus of the present application enables increased efficiency due to the use of an increased number of mold stations supporting individual, removable, multi-section, single cavity molds within individual clamping assemblies on a rotating table. Easy integration of additional upstream and downstream operations is also possible, such as the application of a swager into the press. The modularity of the present apparatus enables the assembly of a completed machine having multiple components or modules in one system which may be readily shipped in a manner which is ready for use right off the truck.

The present injection molding apparatus is provided within a modular frame which supports a fixed injection molding operation station which includes an extruder assembly, and an injection assembly with a nozzle assembly, which are interconnected at a check valve assembly. Elastomeric stock material is supplied to the extruder assembly by a supply assembly. A mold servicer assembly is provided at a disassembly station, adjacent the injection molding operation station, where the multi-section single cavity molds are disassembled and reassembled by the mold servicer assembly prior to engagement with the injection molding operation station. A robotic assembly or robot arm is also supported on the modular frame. The robotic assembly is preferably provided with at least 6 degrees of freedom and is positioned at a corner of the modular frame to permit access to the single cavity mold at the disassembly station as well as to adjacent injection molding systems. Finally, the modular frame supports a rotating table having a plurality of stations along its periphery, preferably at least 8 or more stations. Each station supports a clamping assembly for clamping a multi-section single cavity mold therein during operations at the injection molding operation station and thereafter for curing as the mold moves around the rotating table back to the disassembly station. As used herein, the tern "cure" is intended to include treatment by the application of heat, pressure, or other material treatments whereby the molding process is completed and the manufactured product containing elastomeric materials and any components attains its finished condition.

To begin the process of manufacturing a product, the mold servicer assembly disassembles the multi-section single cavity mold at the disassembly station. Inserts or other product components are supplied to the mold cavity by the robotic arm. Such inserts or components may be supplied to the robotic arm by belt conveyors, bowl or magazine feeders positioned adjacent the rotary injection molding apparatus. Alternatively, an operator may inserts components to be molded prior to the injection operation.

The mold is then reassembled by the mold servicer assembly and moved into engagement within a clamping assembly supported on the rotating table. The rotating table then moves the mold into the injection molding operation station adjacent the extruder and injector assemblies, and a pressure sensitive nozzle assembly is then advanced into engagement with a sprue opening in the mold. Once the nozzle assembly engages the mold, elastomeric material previously provided from the extruder assembly to the injector assembly via the rotary check valve assembly, is then provided to the mold again via the rotary check valve. Once the material is injected into the mold, the rotating table advances the mold to another position, while another mold within a clamping assembly has also been advanced to the injection molding operation station for the next successive injection molding operation. Where the rotating table is provided with 10 stations, additional injection operations are performed successively upon additional molds until the original mold returns to the original station and is provided to the mold servicer assembly for disassembly and removal of the manufactured product. The robot assembly is preferably used to remove the manufactured product, to remove waste material from the sprue opening and runner system, as well as to prepare the mold for the next molding operation, by inserting any necessary product components into the mold cavity.

Following removal of manufactured products and preparation of the mold for the next molding operation, the mold servicer assembly reassembles the multi-sections of the single cavity mold, and the process is repeated as previously described. Manufactured product may be removed to an adjacent belt conveyor to shipping containers, or provided manually or via the robot assembly to additional adjacent processing stations, such as a buffing, oil dipping or swaging station.

A control system is provided for automatically controlling operation of the rotary injection molding apparatus, such as system and component pressures, speeds, temperatures, cycle times and injection volumes.

These and other advantages and features of the invention will be better understood from the detailed description of an embodiment of the invention which is described in conjunction with the accompanying drawings.

BRIEF DESCRIPTION OF THE DRAWINGS

FIG. 3 is a cut-away partial, schematic view of the apparatus of the present invention having safety panels removed, and with optional additional stations shown in the form of a belt conveyor supplying product components, a swager unit positioned adjacent the mold servicer assembly, and a take away belt conveyor for removing completed products from the apparatus;

FIG. 9A is a partial cut away view of the assemblies taken along the line 9-9 in FIG. 6 and with the rotary check valve shown in extrude position;

FIG. 9B is a partial cut away view of the assemblies taken along the line 9-9 in FIG. 6 with the rotary check valve shown in inject position;

FIG. 12A is a partial external perspective rear view of the rotary check valve assembly, and FIG. 12B is a partial external perspective front view of the rotary check valve assembly;

FIG. 21A is a schematic perspective view of a preferred embodiment of a multi-section single cavity mold of the type used in the rotary injection molding apparatus of the present application;

FIG. 21B is a partial cut away side view taken along the line 21B-21B of the mold in FIG. 21A;

FIG. 22 is a schematic perspective view of the mold servicer assembly illustrated in FIG. 19 and shown in an open position for disassembling a mold;

FIG. 23 is a schematic perspective view of the mold servicer assembly illustrated in a closed position in which a mold is supported in an assembled position;

FIG. 29 is a partial, schematic perspective front view of the modular frame supporting partially illustrated elements of the hydraulic, environmental and electrical control systems of the present application;

FIG. 30 is a partial, schematic perspective rear view of the modular frame supporting partially illustrated elements of the hydraulic, environmental and electrical control systems of the present application;

FIG. 31 is a partial, schematic perspective rear view of the modular frame supporting partially illustrated elements of FIG. 30, but with safety panels removed and cabinet doors opened;

DETAILED DESCRIPTION OF THE DRAWINGS

Figure 1:
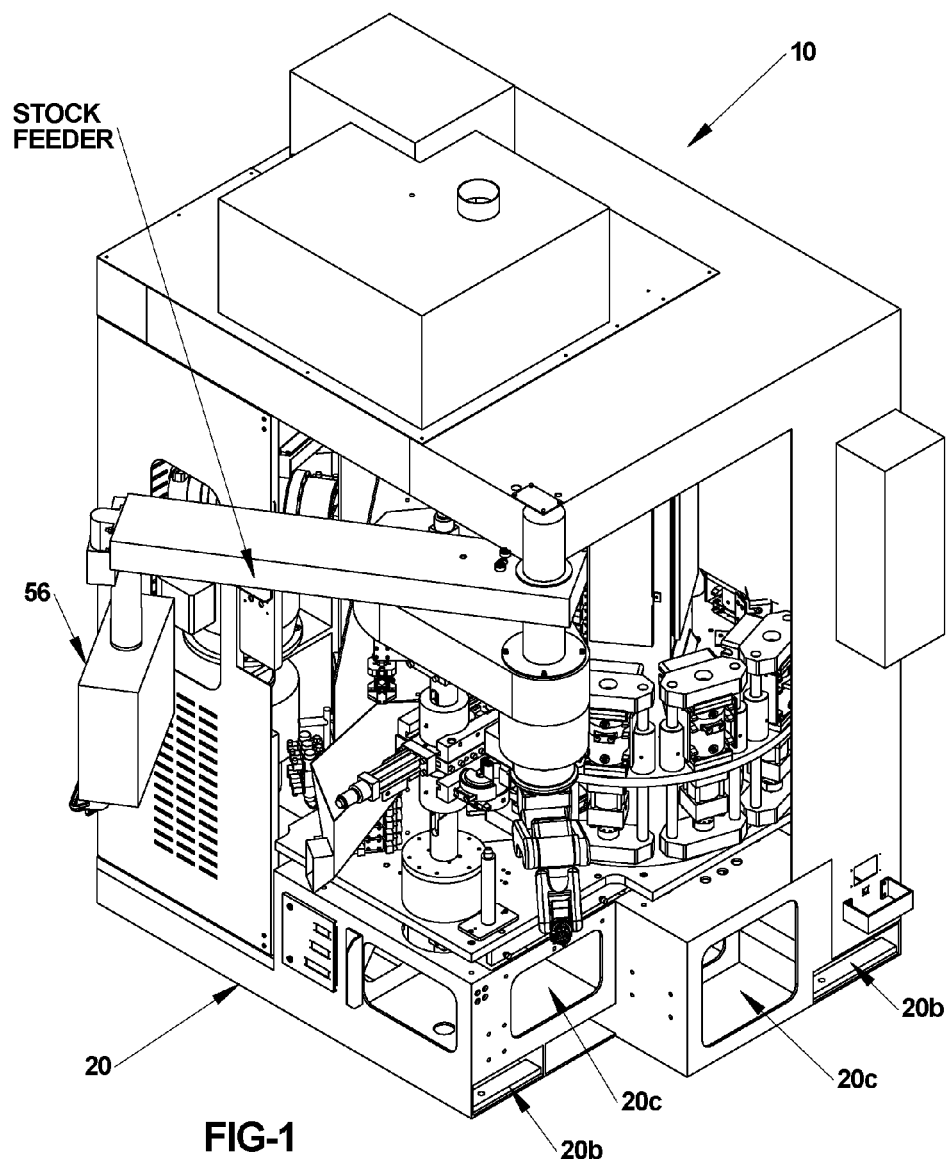
FIG. 1 is a partial, schematic perspective view of the rotary injection molding apparatus of the present application with safety panels removed.
Figure 2:
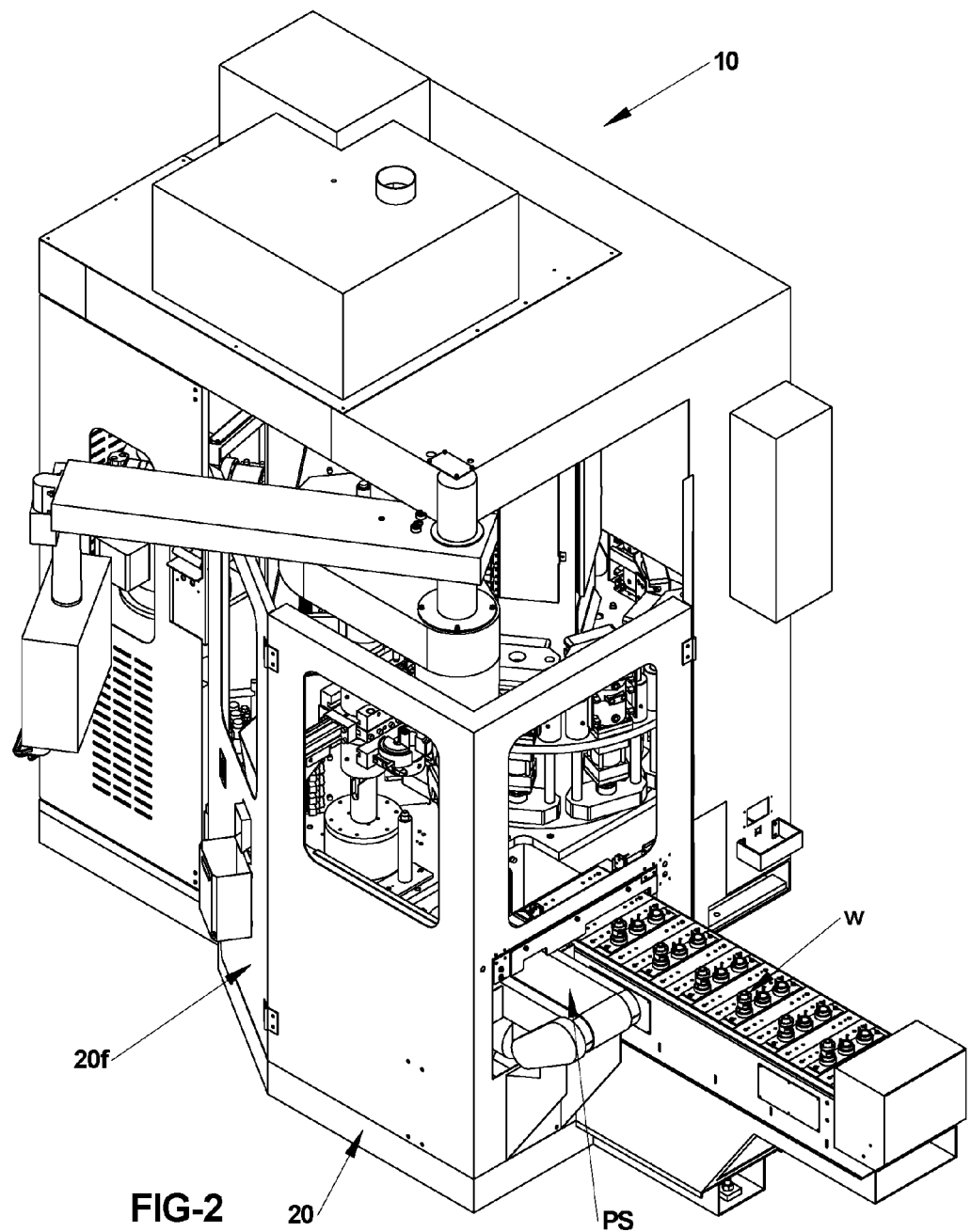
FIG. 2 is a partial, schematic perspective view of the apparatus of FIG. 1 having safety panels in place, and with a supply of product components being supplied via a belt conveyor.
Figures 4A, 4B:
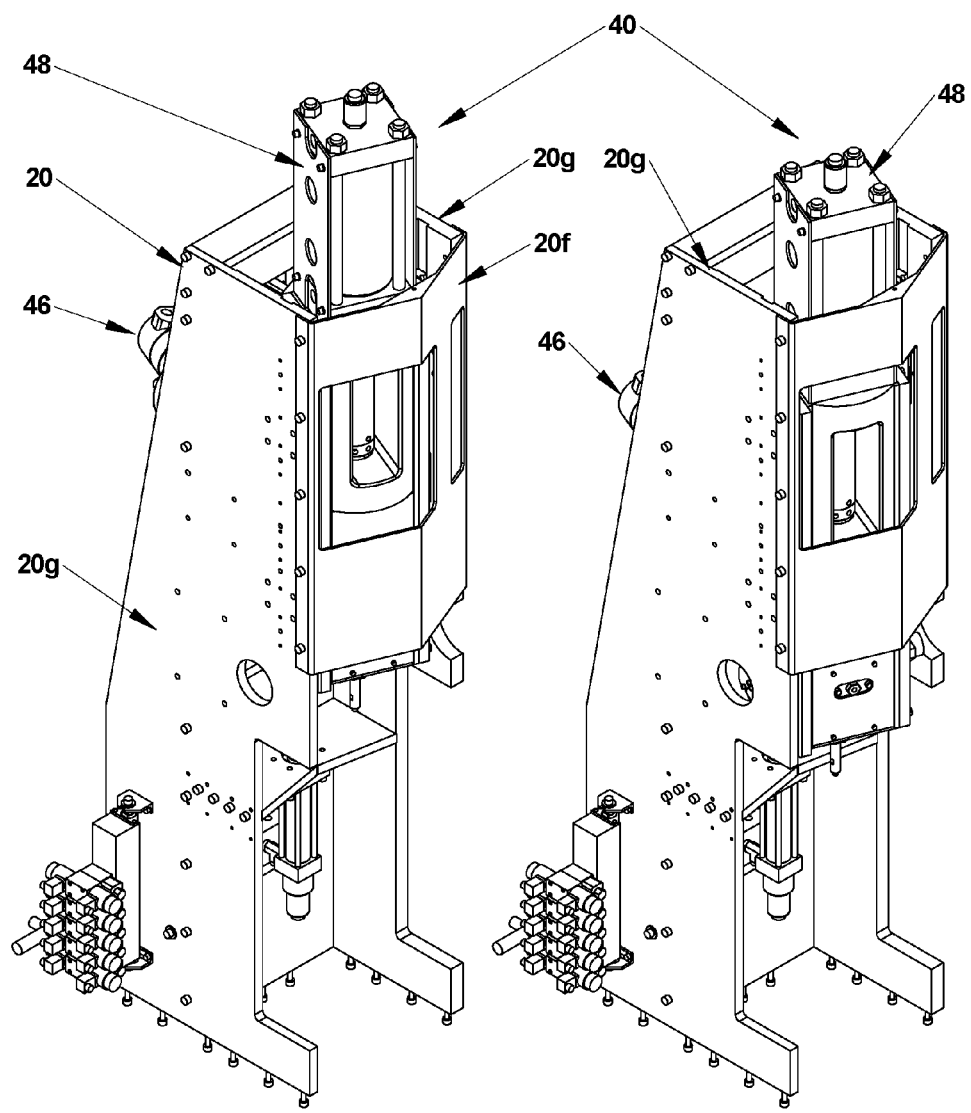
FIGS. 4A and 4B are cut away partial, schematic views of the injector and extruder assemblies supported on portions of the modular frame, with FIG. 4A showing the injector assembly in a raised position and FIG. 4B showing the injector assembly in a lowered position where the nozzle assembly would engage a mold.
Figures 5, 7:
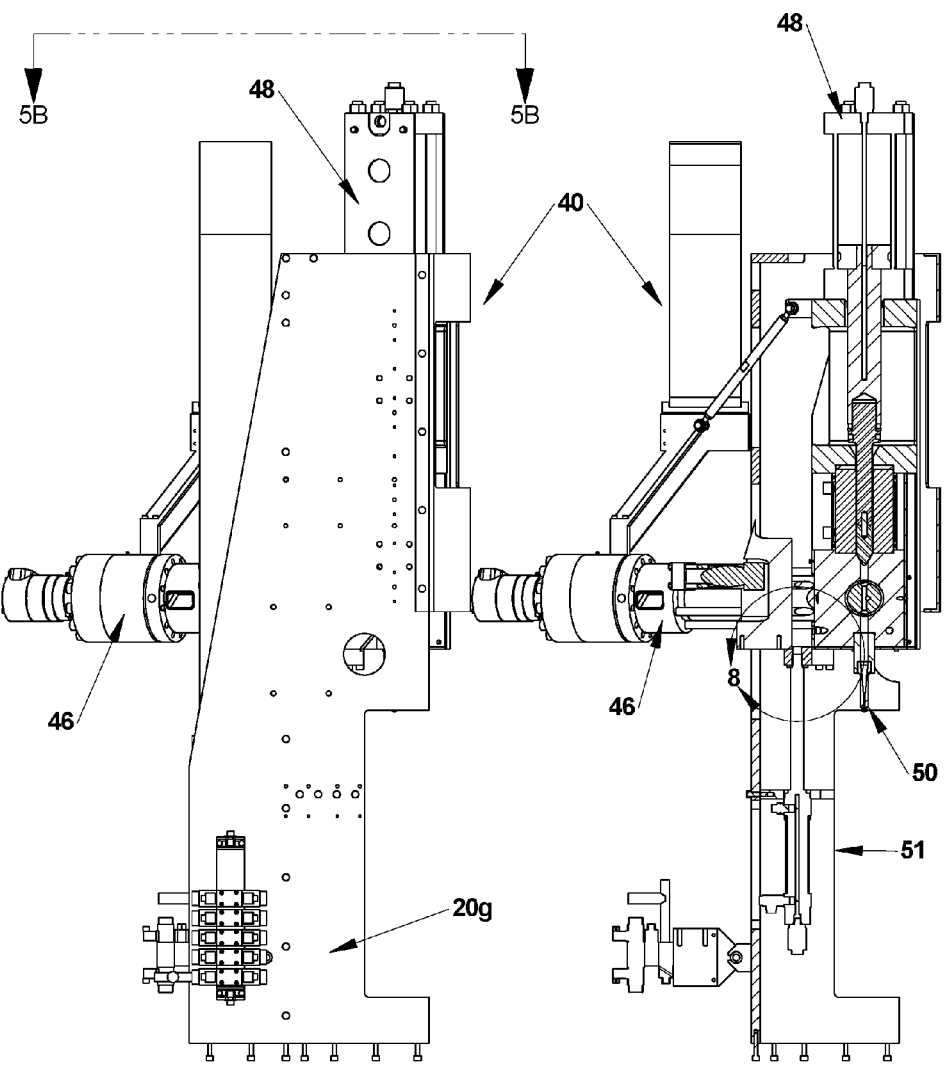
FIG. 5 is a side view of the assemblies shown in FIG. 4A.
FIG. 7 is a cut away side view of the assemblies taken along the line 7-7 in FIG. 6.

Turning now to the illustrations of the present embodiment, a multi station rotary injection molding apparatus 10 provides high production injection molding of manufactured products M. In the illustrated embodiment, the rotary injection molding apparatus 10 is supported on a modular frame 20 and includes a rotating table 22 having 10 work stations 24 positioned along the periphery of the rotating table 22. Independent clamp assemblies 28 are supported on the rotating table for engagement with a single extruder and injector assembly, also supported on the modular frame 20. In the preferred embodiment of the apparatus, cure times for manufactured products M are between approximately 75 to 160 seconds per product, and preferably approximately 80 seconds per product. With small multi-section single cavity molds 30, cycle times for movement between positions or stations may be 20 to 30 seconds.

All press operations are automatic and controlled by an Allen Bradley programmable logic controller, such as an SLC 5/05 PLC. Additionally, the apparatus is programmed using Allen Bradley RS Logix 500 software, as well as a variety of other Allen Bradley system controllers, for example, for remote scanner modules in communication with the rotating table (1747-SN), servo controllers (1398 Ultra AC), drives for motor speed control, IEC style pushbutton switches, and guard master safety relays and emergency stop buttons, as well as other conventional controllers all of which are well known to one of ordinary skill in the art and are collectively referred to herein as the central control system 54. Operation of these numerous controller, drive, sensor and switch components are provided at an operator interface terminal, such as a Parker Automation CTC PS10 color touch screen 56 which is illustrated in FIG. 1 on a control arm which enables the terminal to clear all equipment and secondary equipment.

Figure 33:
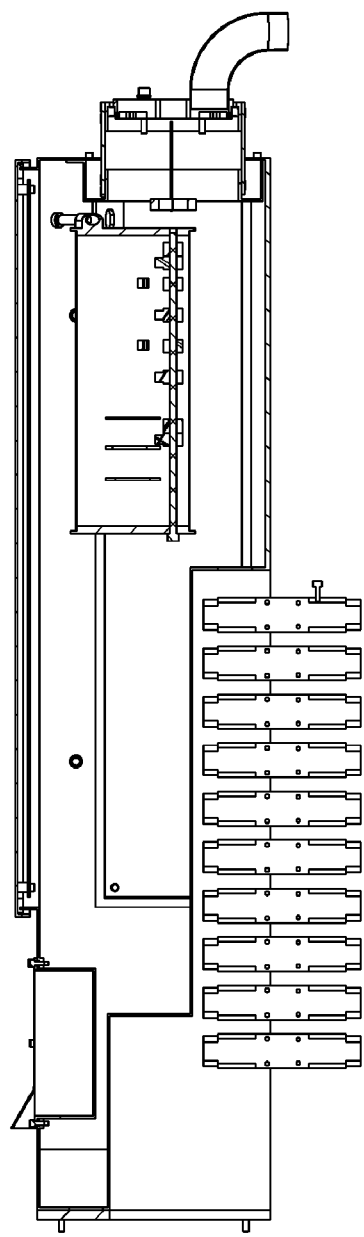
FIG. 33 is a schematic cut away side view of the assembly control system taken along the line 33-33 of FIG. 32.
Figure 32:
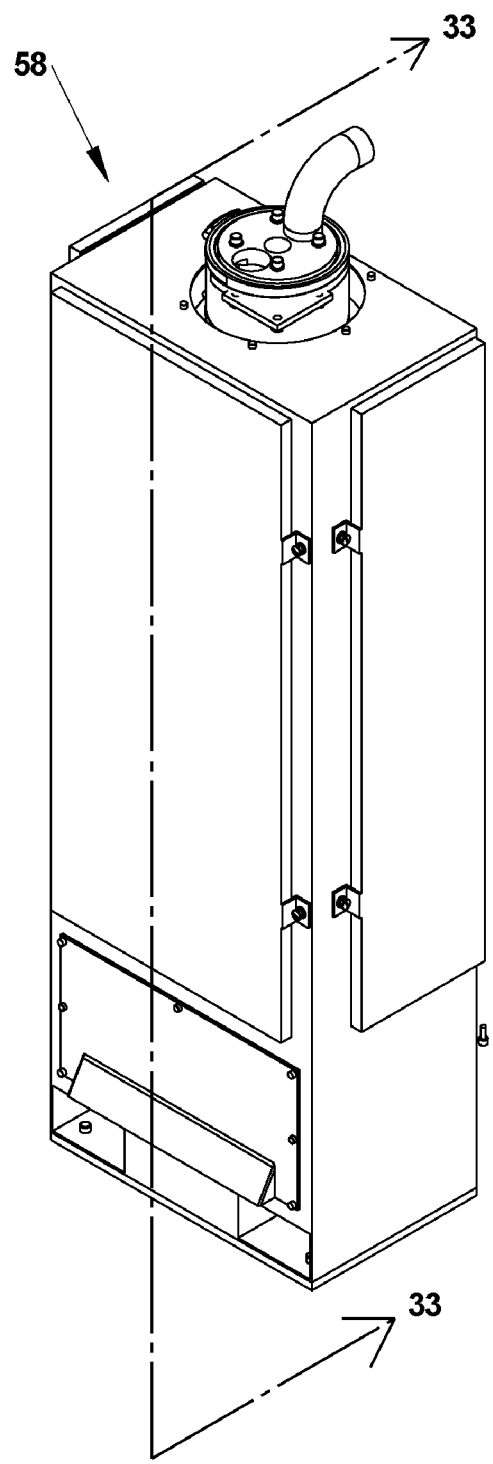
FIG. 32 is a schematic perspective view of a portion of the assembly control system regulating certain of the environmental, electrical and valving systems of the present application.

Certain of the environmental, electrical and valve systems are provided within a central cabinet 58 located within the modular frame 20 as shown in FIGS. 29, 32 and 33. Air intake and exhaust are provided from the central cabinet via a rotary air union to provide air cooling for the control components. The improved cabinet 58 is fully insulated and includes 3 insulated doors upon which electrical components may be mounted, and which also enable ready access to the controls for repair and cleaning. Additional system units, such as the Rexroth hydraulic unit 59 with dual smart pumps, are also secured to the modular frame, and preferably at corner locations such that ready access to the units is provided upon removal of the adjacent doors or safety panels 20f, as shown in FIG. 29. Likewise, electrical connections are provided adjacent frame openings and connections are preferably quick disconnect components to permit quick change out of components.

In the illustrated embodiments of FIGS. 1 through 7, 15-16 and 29 to 31 elements of the modular frame 20 are illustrated. For example, the frame supports each of the apparatus components on a machined base plate 20a and their positions are registered with respect to each of the other components. Fork lift openings 20b are provided to enable convenient movement of the apparatus from one location to another and for shipment. Additional attachment openings 20c are provided to enable attachment of additional upstream or downstream processing stations PS of the type illustrated in FIG. 2, such as intake and take away conveyors, swaggers, carousels, bowl feeders, quality control vision checks, as well as other necessary processing options. The open structure of the modular frame also enables the use of storage drawers 20h of the type shown in FIG. 29 through 31, which provide ready access to the electrical systems, temperature and air regulators which may be supported therein.

Figure 15:
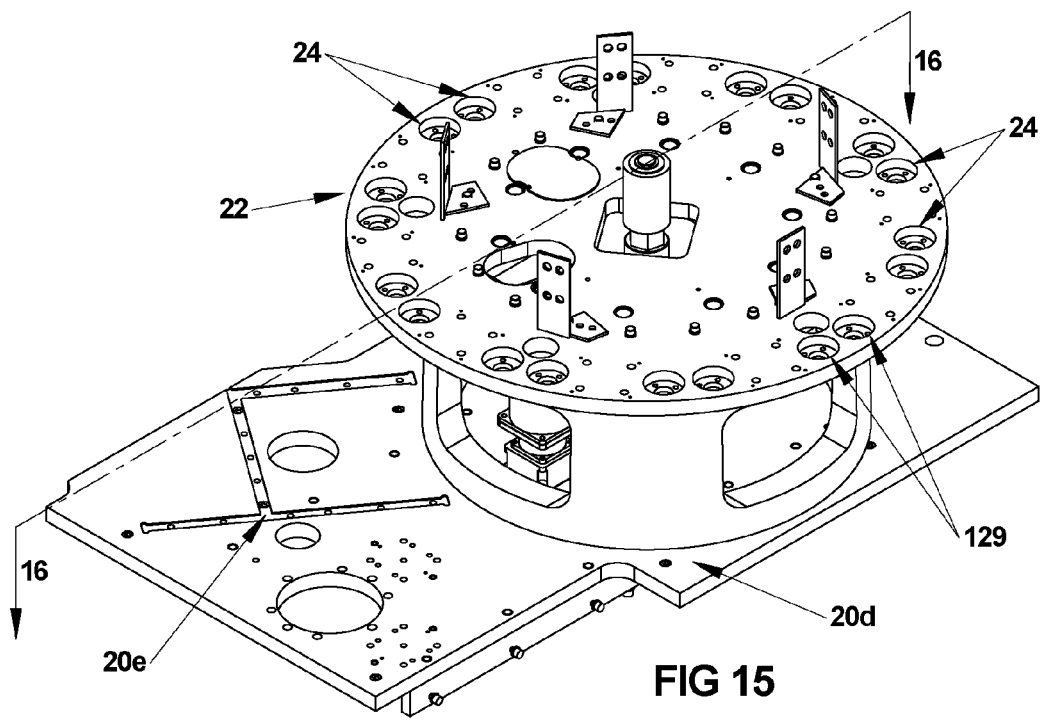
FIG. 15 is a partial perspective view of the rotary or rotating table of the present application.
Figure 16:
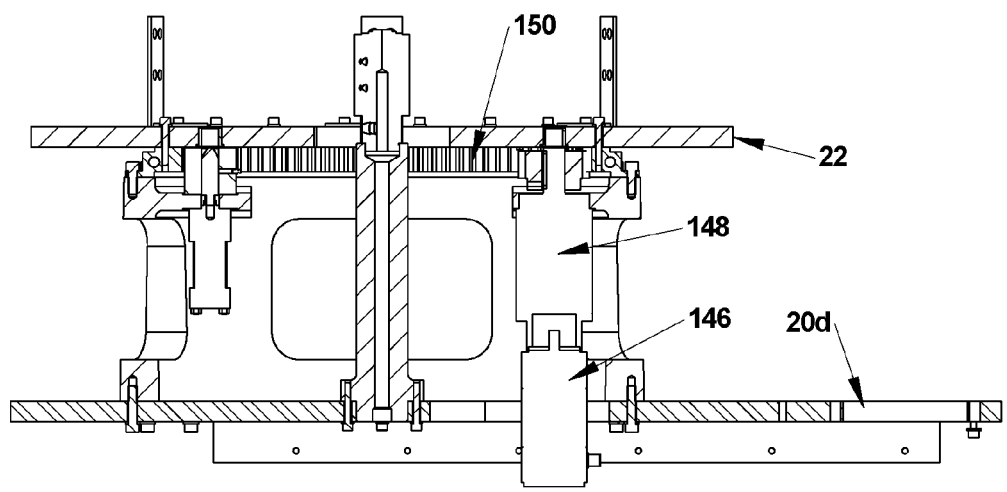
FIG. 16 is a cut away view of the rotary table taken along the line 16-16 of FIG. 15.

As shown in FIG. 15, additional components, such as a rotating table platform 20d, are secured to the base plate 20a using conventional fasteners. Grooves 20e are provided to ensure proper positioning or registration between the apparatus components. The rotating table platform grooves 20e are engaged by frame sidewalls 20g which support additional apparatus components. The use of the modular frame of the present invention provides the apparatus with a small plant floor footprint, many space saving aspects, as well as the ability to surround the apparatus with safety panels 20f for operator protection.

The injection molding apparatus modular frame 20 supports a fixed injection molding operation station 40 which includes an extruder assembly 46, and an injection assembly 48 with a nozzle assembly 50, which are interconnected at a rotary check valve assembly 52.

Figure 6:
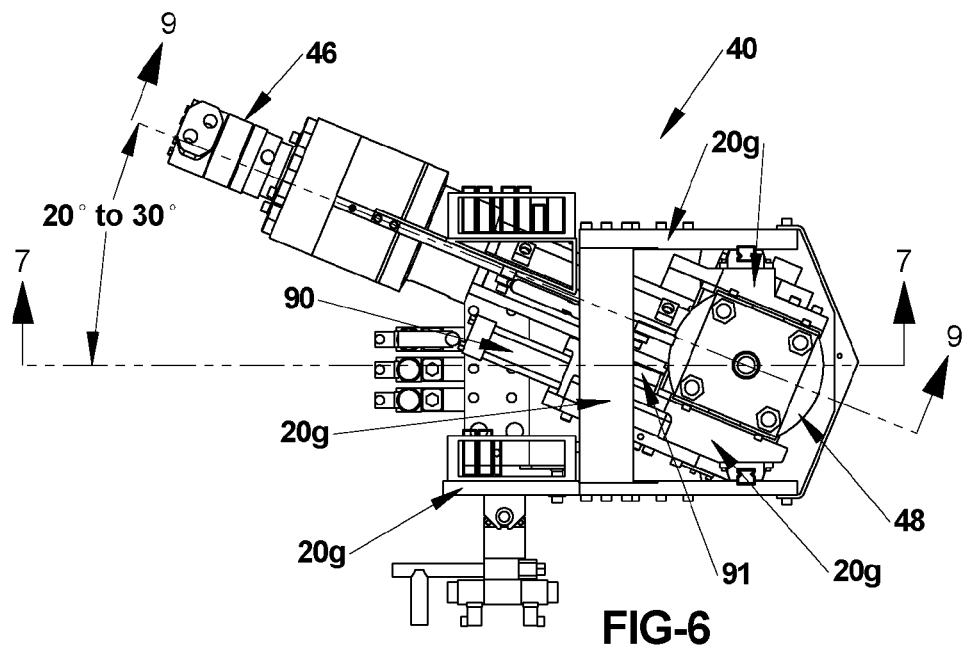
FIG. 6 is a top view of the assemblies shown in FIG. 5.
Figure 8:
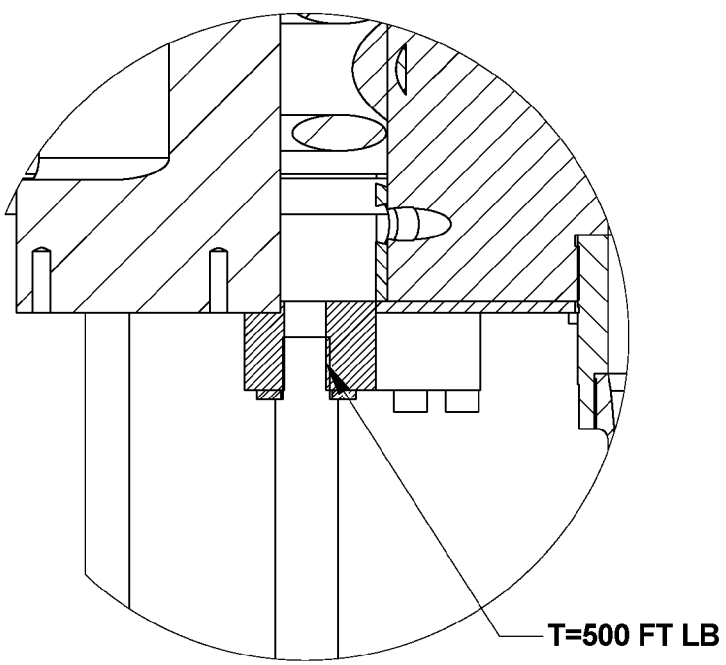
FIG. 8 is a partial detail view of the portion circled at the designation 8 in FIG. 7.

As show in FIG. 6, the frame side walls 20g supporting the injector and extruder assemblies are of different thickness. The side walls are preferably aluminum castings to support the necessary pressures provided to the mold 30 at the injection molding operation station 40. Additional strengthening ribs or cross bracing 20i are provided between the sidewalls to resist twisting movement and ensure support of the assemblies at the station 40.

Elastomeric stock material is supplied to the extruder assembly through a door adjacent the extruder assembly by a supply assembly (not illustrated). The extruder assembly is designed with all bolt fasteners 88 on one end, which extend to enable the use of larger rods, which improves wear resistance in the internal seals and permits the use of higher extrusion pressures. The material is plasticized by the rotating extruder screw 94 using a hydraulic motor 86. The extruder is provided with a heated jacket to maintain material temperatures at the preset desired temperature for proper curing of the material. A precise amount of desired and predetermined material is then fed through a mechanical rotary check valve assembly 44 to the injector assembly 48

Figure 13:
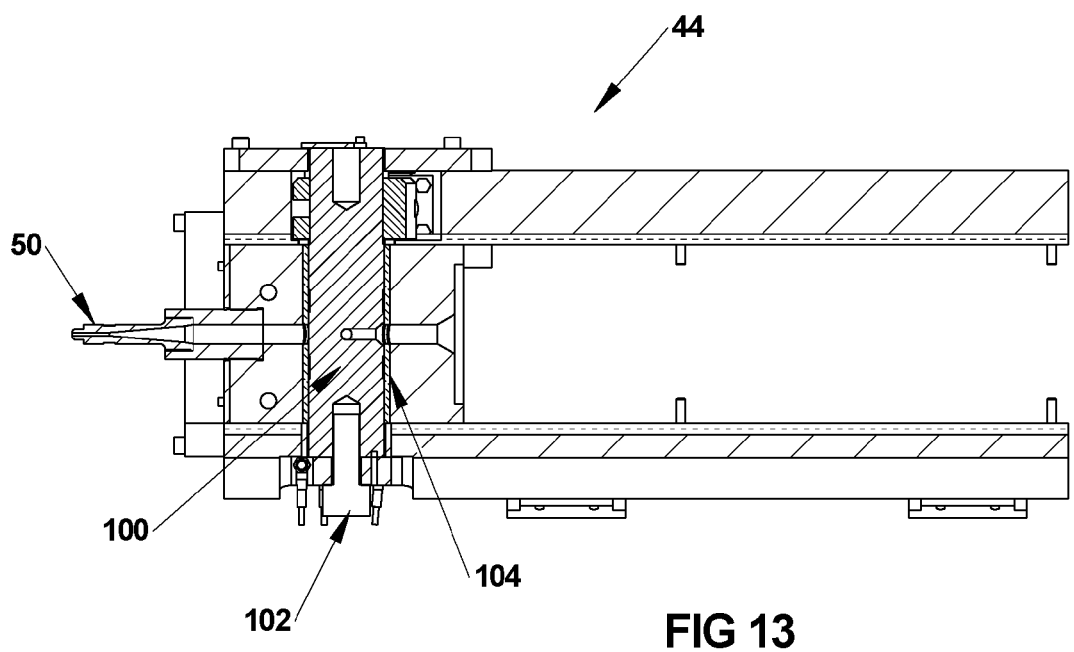
FIG. 13 is a cut away view of the rotary check valve assembly taken along the line 13-13 in FIG. 12A.

The rotary check valve assembly 44 is also mounted between cast aluminum sidewalls 20g, which are engaged along mating rails with the sidewalls of the injection molding operation station as shown in FIG. 6. A hydraulic unit 90 which rotates the check valve assembly is likewise located within a cast housing 91 to support the assembly for high pressure operation. The use of a stronger housing resists movement of the assembly 44 during operation which provides more accurate operation. The interior portion of the sidewalls adjacent the injector assembly is provided with insulation material 92. When in the position illustrated in FIG. 9A, the rotary check valve 100 provides a material flow path to the injector assembly 48. When the injection chamber 110 of the injector assembly is filled to the proper amount, the rotary check valve 100 is moved to the position shown in FIG. 9B by the hydraulic unit, and a flow path is provided for the material to be injected into a mold 30 via a nozzle assembly 50. In the event it is necessary to remove material from the extruder or injector assemblies, removal of the bolt 102 from the rotary check valve assembly 44 enables materials within either assembly to be readily removed. The rotary check valve 100 is preferably a steel valve with an Armalloy® coated bronze sleeve. Additionally, as shown in FIG. 13, the rotary check valve is maintained within the assembly 44 by a bolt 102'. By removing the bolt 102' the entire valve 100 may be readily removed from the assembly. Alternatively, the opening provided for bolt 102' could be provided with a temperature sensor or other control device, as the system may require.

Figure 11:
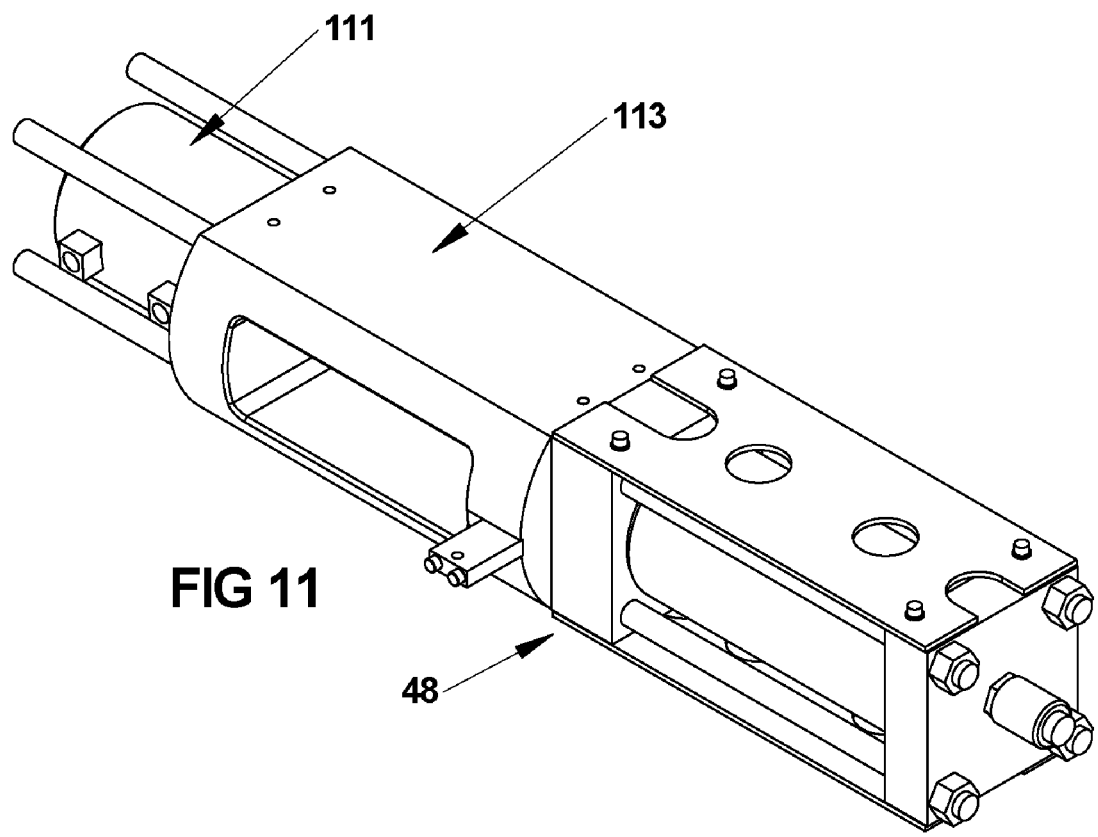
FIG. 11 is a partial external perspective view of the injector assembly of the apparatus of the present application.
Figure 10:
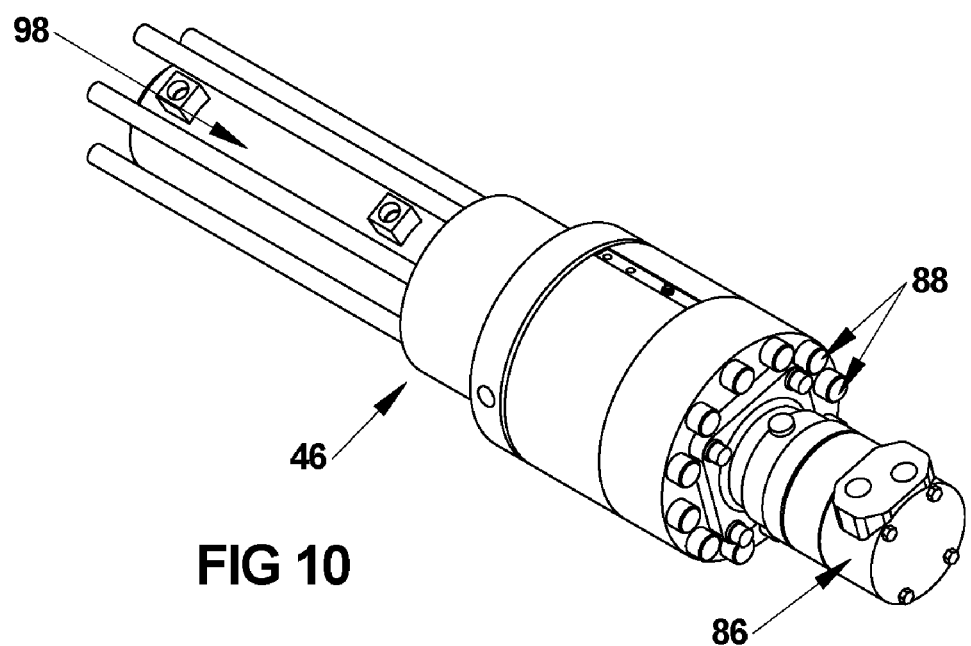
FIG. 10 is a partial external perspective view of the extruder assembly of the apparatus of the present application.
Figure 14:
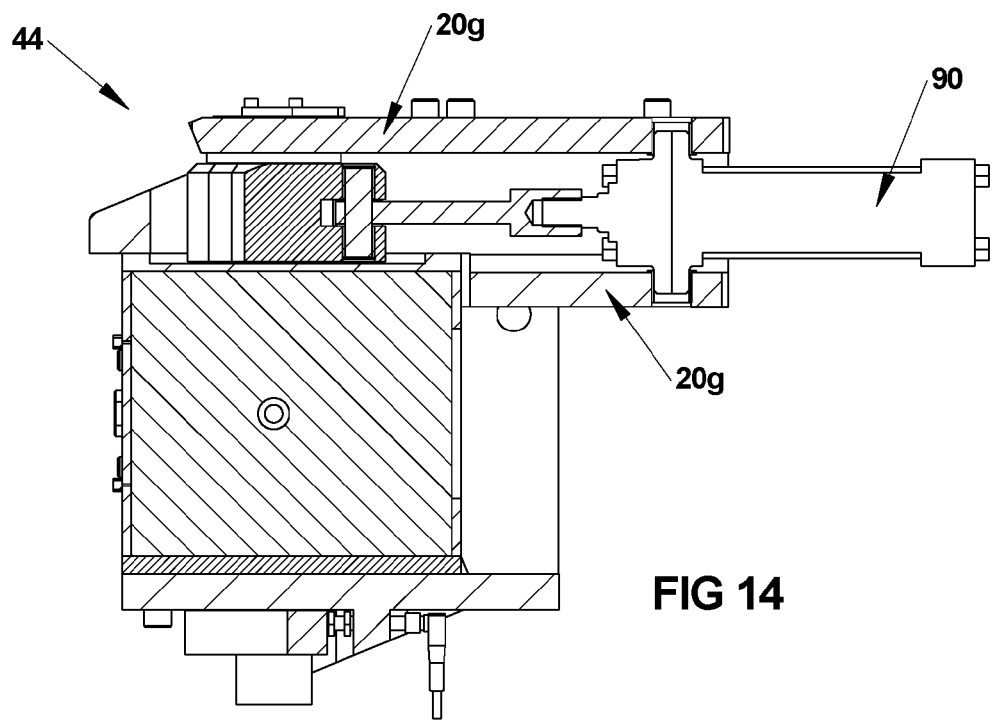
FIG. 14 is a cut away view of the rotary check valve assembly taken along the line 14-14 in FIG. 12B.

The central structure of the injector assembly 48 is preferably illustrated machined of round bar stock 113 with an opening for providing access to the assembly 48 for cleaning and changing of worn parts. The assembly includes a heated thermal jacket 111 to maintain material temperatures. The hydraulic unit 112 and heated jacket 111 are interconnected with the intermediate bar stock 113 via four tie rods as shown in FIG. 11. FIGS. 9A and 9B illustrate that the injector assembly plunger tip 114 is provided with a Teflon® bronze seal, which together with the injection pressure provided during the injection operation, form surrounding seals which prevent material from moving backward in the injection chamber and thereby reduces wear. Additionally a chamfered opening or lead in 108 is provided into the injection chamber 110. The combination of the lead in 108 with the aligned sealed tip functions to keep the plunger aligned and also reduces plunger tip wear.

Figure 19:
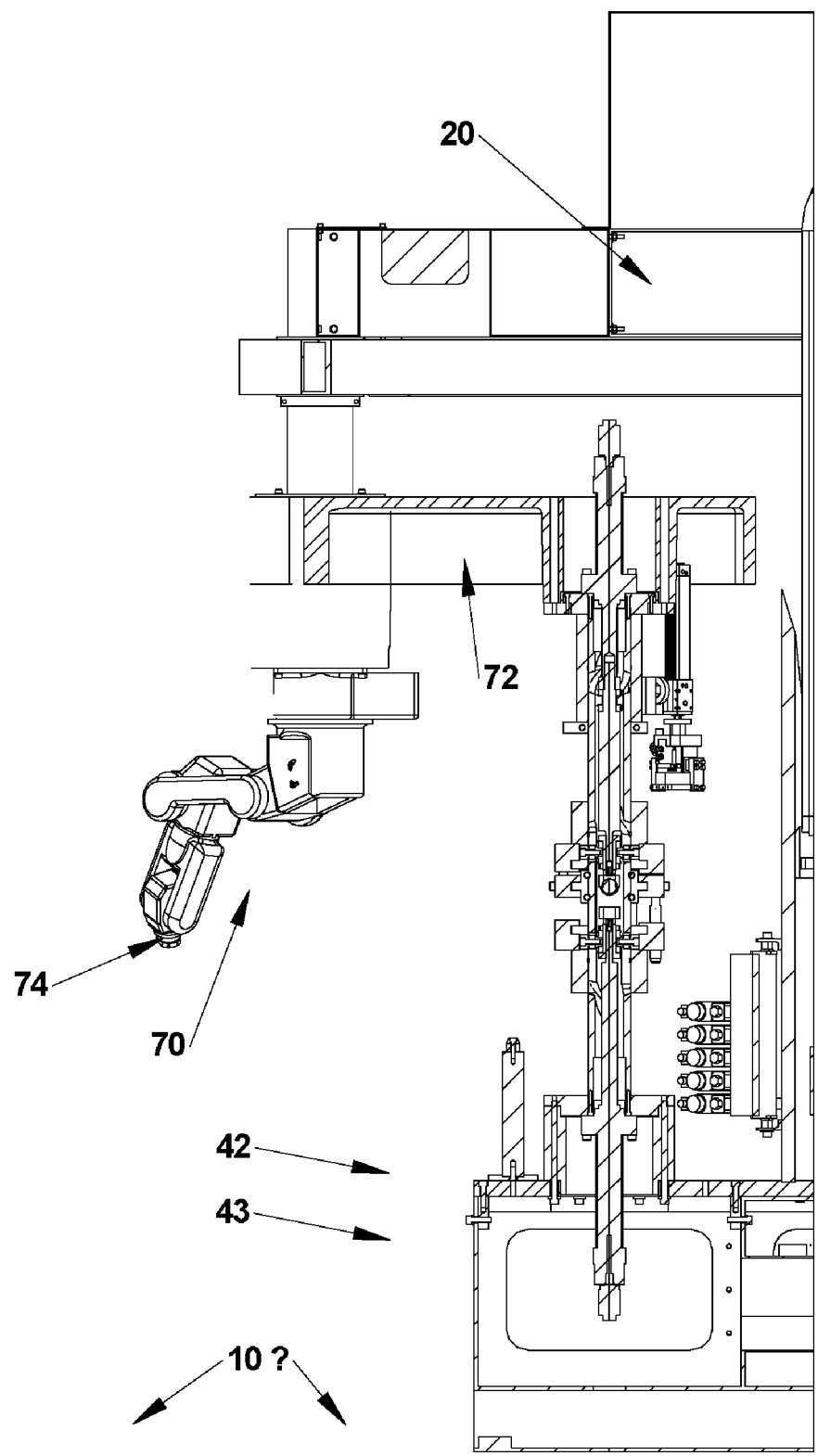
FIG. 19 is schematic cut away side view of the robotic assembly and the mold servicer assembly mounted on a corner of the modular frame of the rotary injection molding apparatus of the present application for use at an optional adjacent rotary injection molding apparatus illustrated schematically.
Figure 20A:
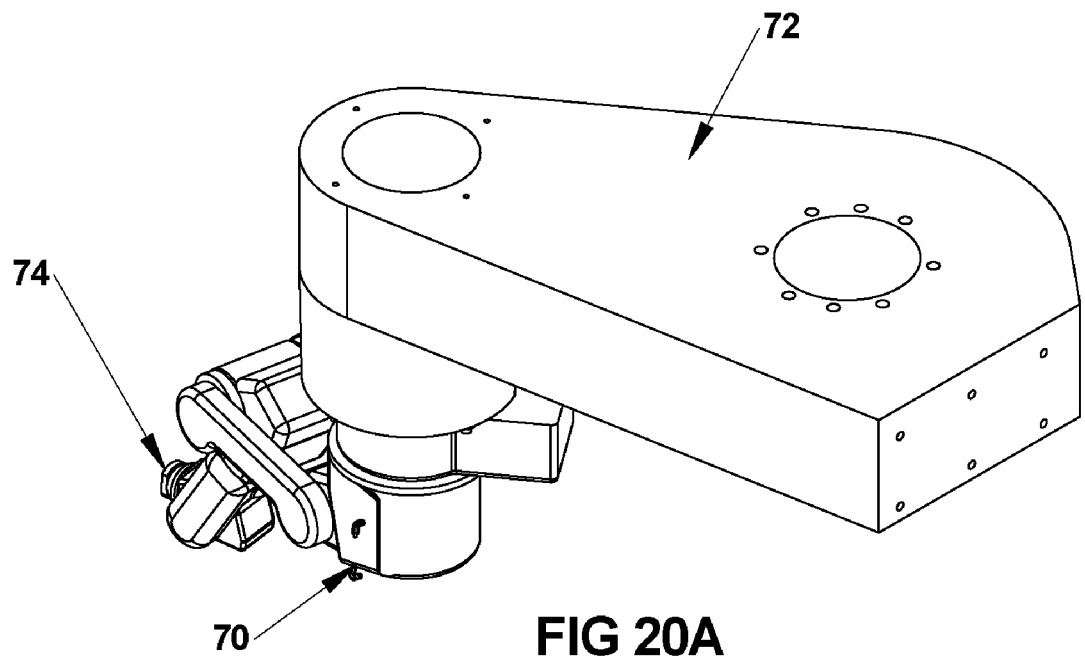
FIG. 20A is a schematic partial bottom perspective view of the robotic assembly illustrated in FIG. 20
Figure 20B:
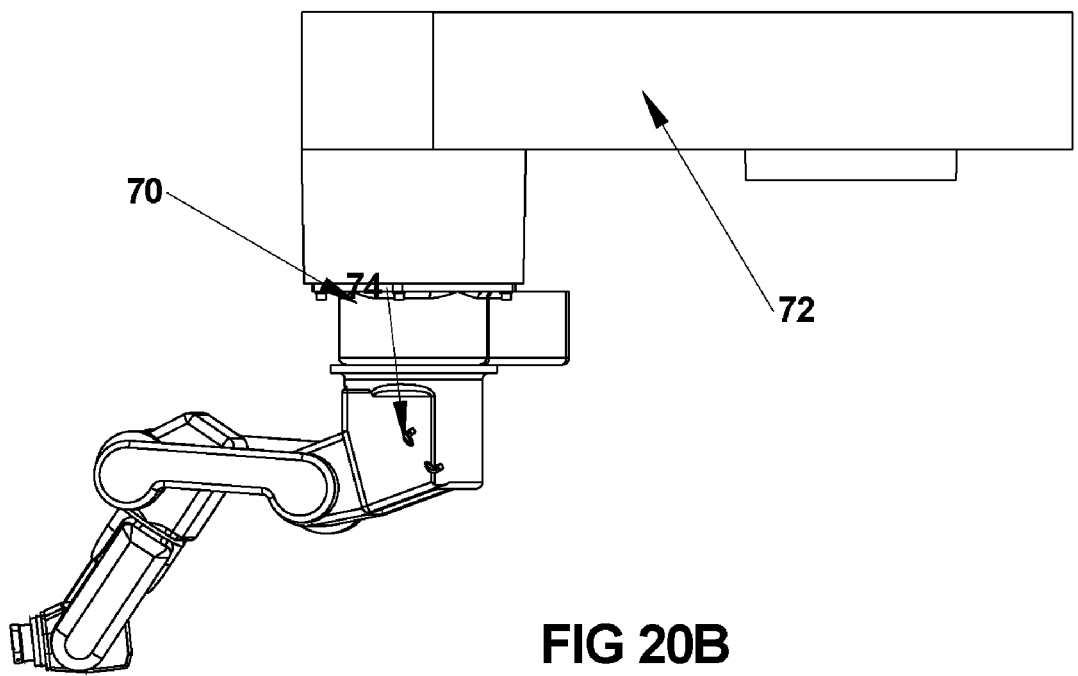
FIG. 20B is a schematic partial side view of the robotic assembly of FIG. 20.
Figure 24:
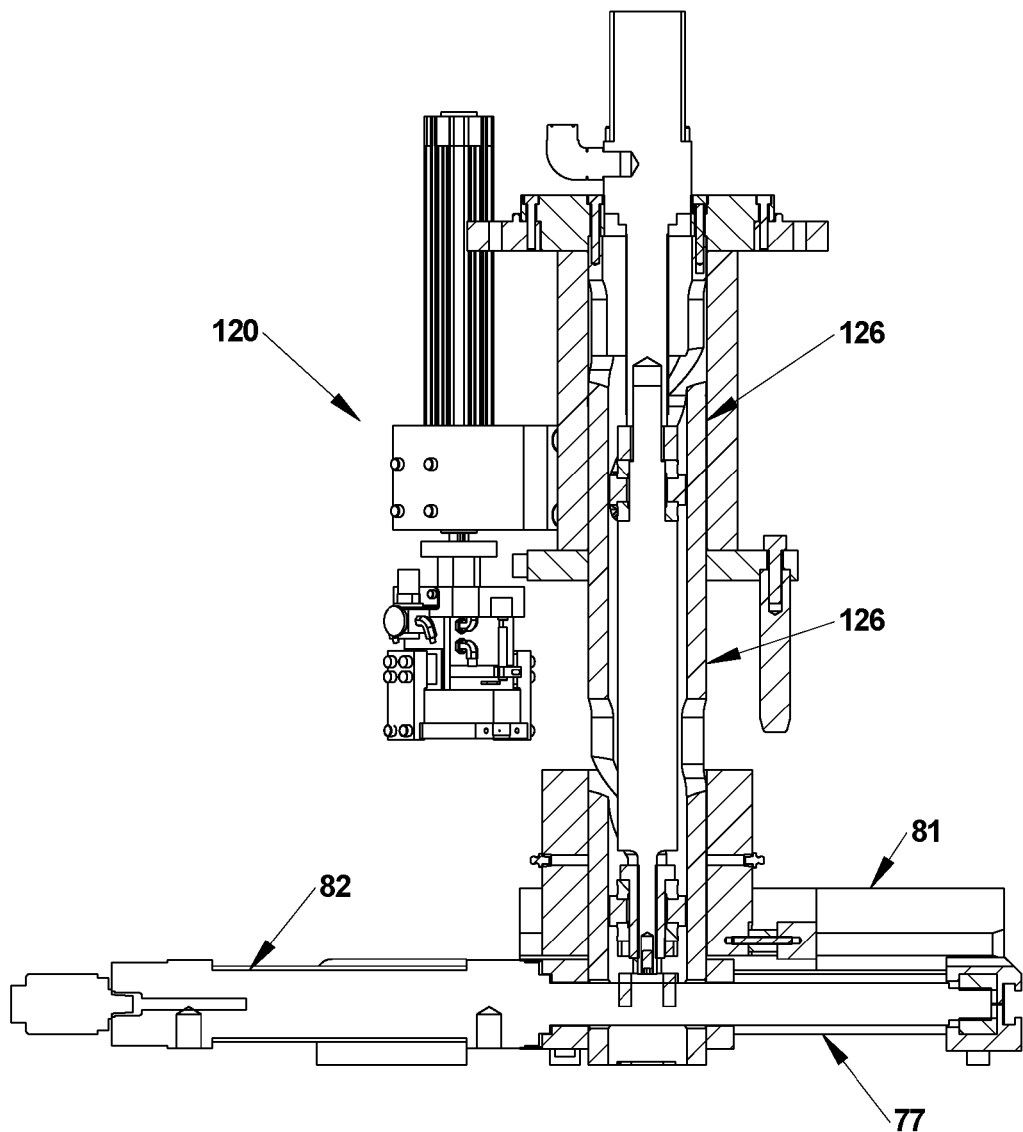
FIG. 24 is a schematic partial cut away view of the mold servicer assembly taken along the line 24-24 of FIG. 22.
Figure 25:
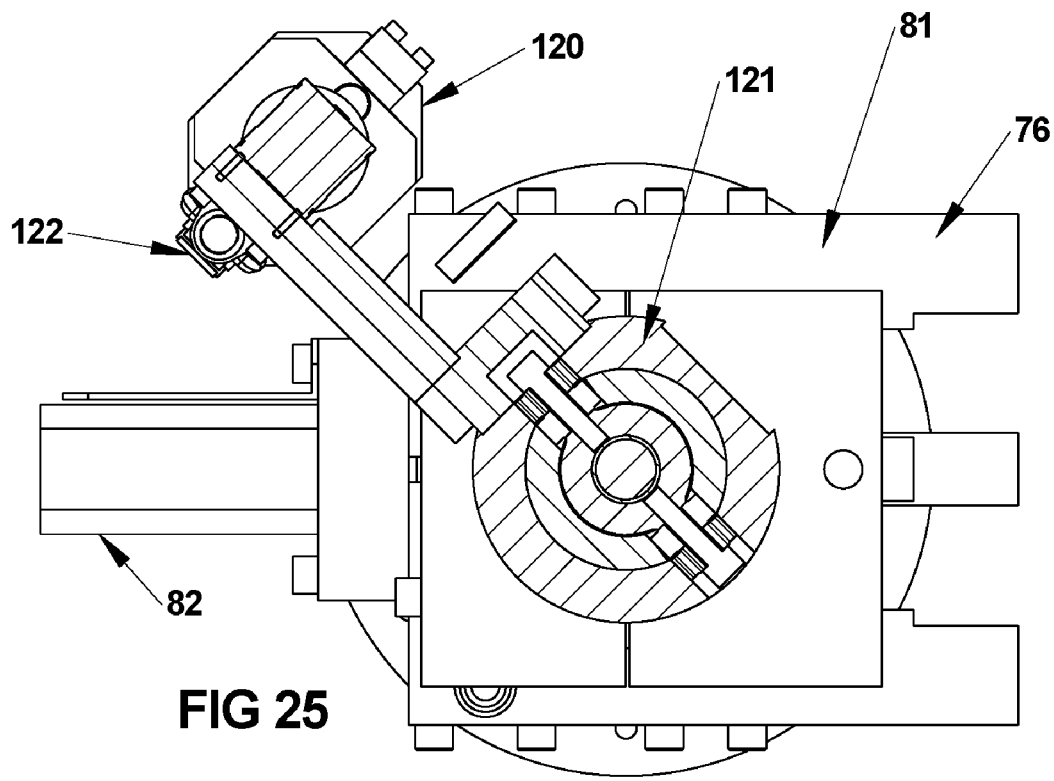
FIG. 25 is a schematic partial cut away view of the mold servicer assembly taken along the line 25-25 of FIG. 23.
Figure 26:
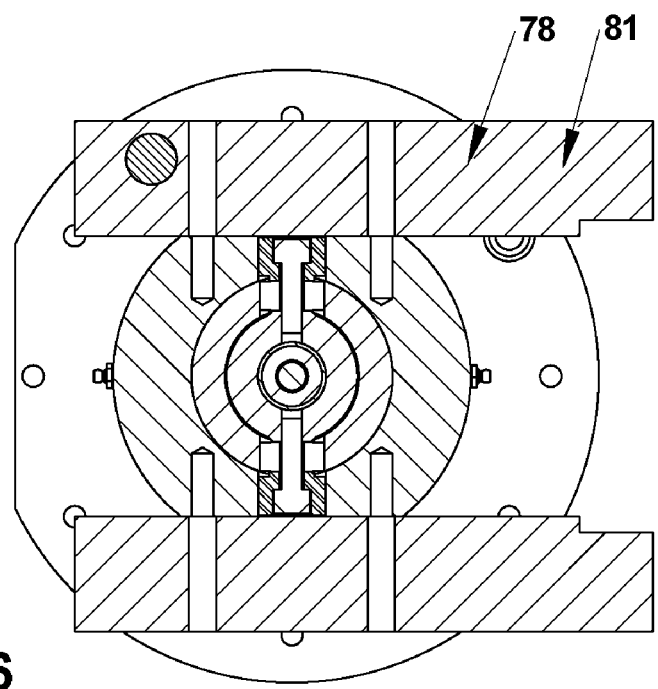
FIG. 26 is a schematic partial cut away view of the mold servicer assembly taken along the line 26-26 of FIG. 22.
Figure 27:
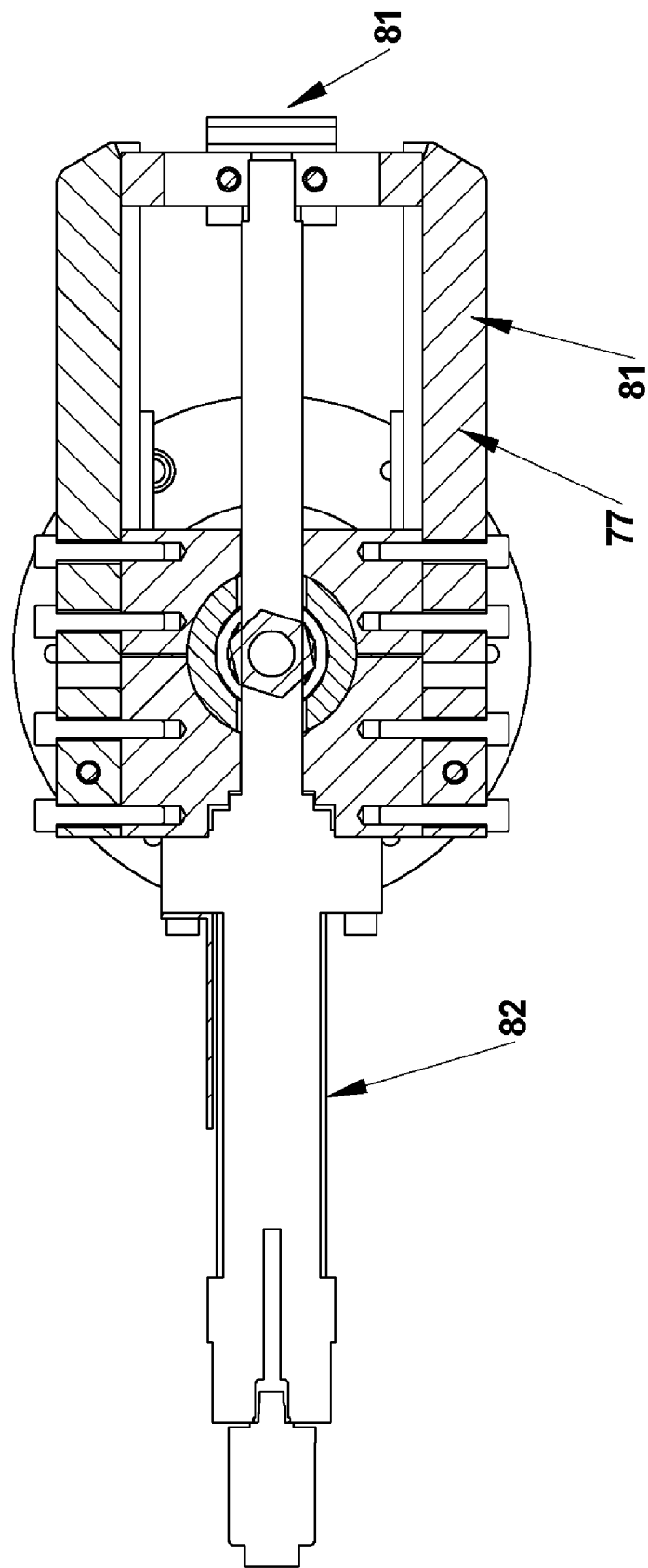
FIG. 27 is a schematic partial cut away view of the mold servicer assembly taken along the line 27-27 of FIG. 23.

Before injection of the mold 30 with elastomeric material begins, the mold servicer assembly 42 disassembles the multi-section single cavity mold 30 at the disassembly station 43. The mold servicer assembly 42 and disassembly station 43 are shown in FIG. 19 supported adjacent the injection molding station 40 and a robotic arm assembly 70.

The preferred multi-section single cavity mold to be supplied to the mold servicer assembly 42 is illustrated in FIGS. 21A and 21B. The mold is a three part or section mold with top, middle and bottom sections 32, 33 and 34, respectively. However, two, four or more mold sections may be desired. The external surface of the mold 30 is preferably provided with ¼ inch aircraft insulation. A round body design is also preferred. Each section is provided with mounting structure or rails 60 for being supported within the mold servicer assembly 42, and a side rail 60' is also provided for movement of the middle mold section 33. A sprue opening 38 engages the nozzle assembly 50 during injection, and the mold material is provided to the mold cavity 62 via sprue channels 36. In the illustrated embodiment the top plate 32 is effectively a removable sprue plate which enables access to the sprue opening 38 and channel 36 for more reliable removal of waste sprue material with the top plate 32. Inserts W or other product components are supplied to the mold cavity 62 by the robotic arm assembly 70.

The robotic assembly or robot arm 70 is also supported on the modular frame 20. The robotic assembly illustrated is an Adept six axis robot. The robot arm preferably includes 6 degrees of freedom to provide more versatility of functionality and to reduce cycle time. The robot arm is supported on the frame 20 by an aluminum cast plate 72. The plate 72 is provided offset from the modular frame 20 to allow greater range of motion, and is also positioned at a corner of the frame 20 to permit optional access to additional adjacent injection molding systems 10', as shown in FIG. 19. The robot arm 70 may be positioned in either a conventional configuration, or in an inverted mounting configuration as shown in the figures. A Robohand quick change robot end 74 is provided for engagement with product inserts or components W and finished products M.

The mold servicer assembly 42 first receives the mold 30 in an assembled condition when the mold servicer assembly 42 is in a closed configuration as shown in FIG. 23. In this position the mold top section 32 is engaged along its mating rails 60 within grooves or guide bars 81 in an upper mold assembly 76. The mold middle section 33 is engaged along its mating rails 60 within guide bars 81 in a center mold assembly 77. The mold bottom section 34 is engaged along its mating rails within guide bars 81 in a lower mold assembly 78. Each of the upper, center and lower mold assemblies 76, 77, 78 of the mold servicer assembly is provided with a hydraulic cylinder unit 82 for movement of its respective mold section. Each of the hydraulic units 82 preferably includes a Temposonics position sensor to provide true position information to the system controller 54 and thereby obtain more controlled motion of the assemblies, such as variable speed. The hydraulic cylinder units 82 are provided so that they can be individually removed from the mold servicer assembly 42 while it is fully assembled. Additionally, each of the guide bars 81 are removable from their respective assemblies for providing alternative split mold options.

Figure 28:
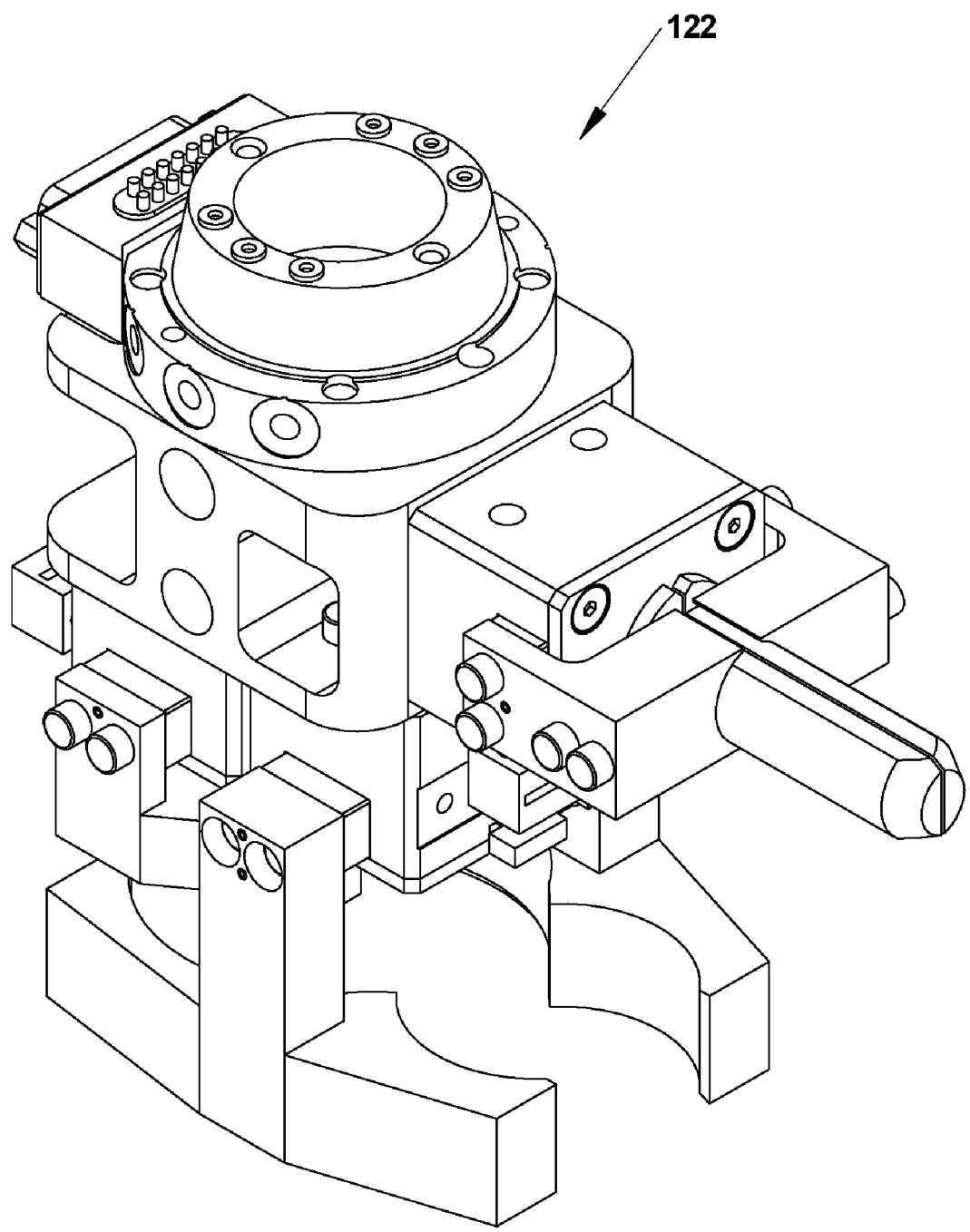
FIG. 28 is a schematic partial perspective view of the robotic gripper assembly illustrated supported on the mold servicer assembly in FIG. 23.

Once the mold 30 is positioned within the mold servicer assembly 44, the hydraulic cylinder units of the upper and lower assemblies operate to disassemble the mold by vertically moving and rotate the top and bottom mold sections, respectively, to the locations shown in FIG. 22. The upper assembly 76 is moved vertically upward to a position where a sprue picker assembly 120 (shown in FIG. 28) having a Robohand gripper 122 providing several degrees of freedom of movement, may access a sprue opening 28 in the mold middle section 33 to remove any waste material remaining in the mold from a prior molding operation. An integrated rotary mechanism 121 turns with the upper mold assembly 76. To remove any manufactured products M from the bottom mold section 34 within the lower mold assembly 78, the assembly may rotate down upon a pin which would raise the product M within the bottom mold section 34 and enable the robotic arm 70 to readily gain access to the product.

The center mold assembly 77 does not rotate but moves horizontally using the hydraulic unit 82 for an appropriate distance for any necessary middle mold section 33 adjustments. A high powered magnet 124 is provided adjacent the guide bars 81 for maintaining mold sections within the guide plates 81 during rotating movement of the mold servicer assembly 42. Rotating movement during the vertical lifting and lowering of the upper and lower mold assemblies, 75, 78 is assisted with thick wall guide cams or cam followers 126 along the central axis of the mold servicer assembly 42, which cam follower 126 is manufactured of bronze for improved wear resistance.

Once any sprue waste and manufactured products are removed from the disassembled mold sections 32, 33, 34, the mold sections may be reassembled by return movement of the mold servicer assembly 42 to the position shown in FIG. 23.

Figure 17:
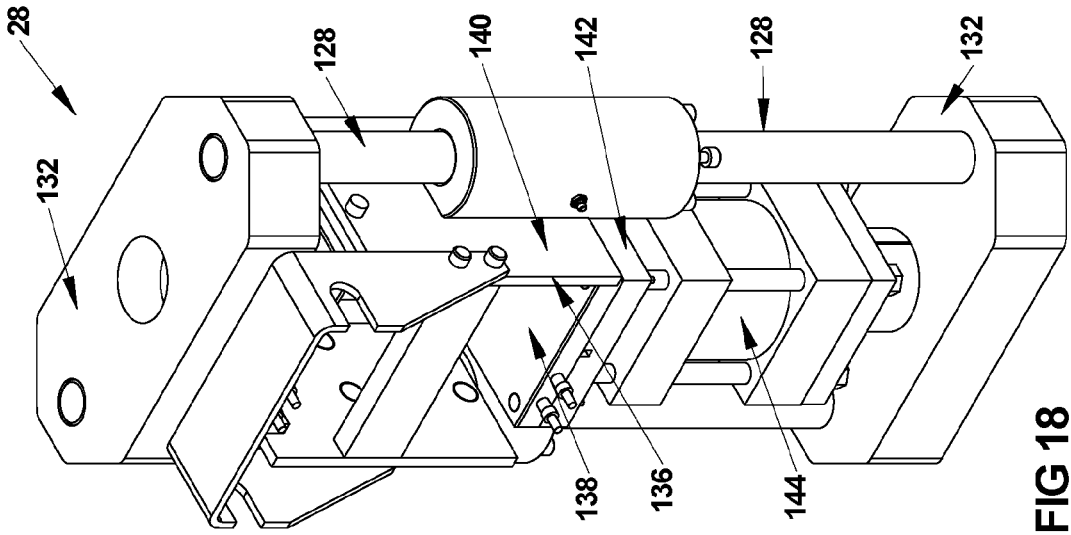
FIG. 17 is a schematic front perspective view of a clamping assembly of the present application which is supported at multiple stations surrounding the rotary table.
Figure 18:
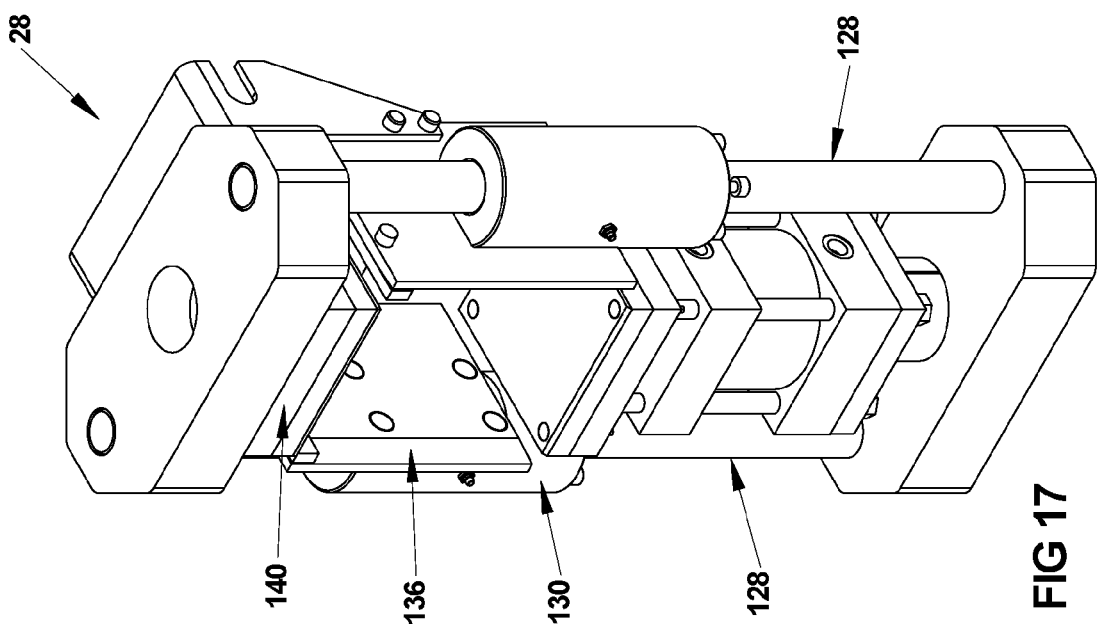
FIG. 18 is a schematic rear perspective view of a clamping assembly of the present application.

The assembled mold 30 is pushed out of the center mold assembly 77 using the horizontal movement of the center mold assembly 77. The mold 30 is pushed into a clamping assembly 28 which is mounted at a work station 24 on the rotary table 22. The upper and lower clamping assembly posts 128 are engaged through spaced openings 129 in the rotary table 22. The posts 128 are joined on top of the rotary table at an upper bridge 132 and under the rotary table 22 at a lower bridge 132'. The posts are joined together adjacent the openings 129 at guide bushings 134. The mounting of clamping assemblies 28 at each work station 24 surrounding the periphery of the rotating table 22 is best seen in FIG. 3. The mold 30 is received into an opening 130 in the clamping assembly 28 which accommodates a mold 30 of approximately 8 inches in height as illustrated in FIG. 17 and using integrated mold guides 136. The mold 30 is engaged on the bottom mold section 32 with a bronze wear plate 138. Upper and lower heated platens 140 are adjacent the mold sections, followed by an inch of insulation material 142 as well as a heater wire cover. A heavy duty hydraulic cylinder 144 is provided for clamping the mold 30 within the clamping assembly during the injection operation at the injection molding operation station 40 and for applying the necessary clamping pressure during curing of the product M as the mold 30 is rotated within the clamping assembly 28 around the work stations 24 at the rotary table 22. The rotary table 22 rotates using an Allen Bradley servo drive motor 146, with an attached gear reducer 148 engaged with gear teeth 150 secured to the bottom of the rotary table 22.

Once engaged within the clamping assembly 28 and clamped, the rotating table 22 then indexes the mold 30 to the injection molding operation station 40 adjacent the extruder and injector assemblies 46, 48. Once the nozzle assembly 50 is lowered into engagement with the sprue opening 38 in the mold, the material is injected into the mold via the extruder, injector and rotary check valve assemblies. A supplemental nozzle touch system 51 has been designed to assist the nozzle assembly 50 so that it may be retracted back from the heated platen to prevent curing of the material inside the nozzle assembly, to provide clearance when the rotary table 22 indexes and to provide access to change out the nozzle.

Once the rotary table 22 has indexed the clamped mold to each of the 10 preferred work stations 24, the mold 30 is returned to the mold servicer assembly 42 and is disassembled to again initiate the molding cycle within the mold. It should be understood that the rotary injection molding apparatus of the present application enables continuous synchronous molding of the single cavity molds 30 within each of work stations 24 and the disassembly station. 43.

While an exemplary embodiment of the rotary injection molding apparatus and its method of use having been described with a degree of particularity, it is the intent that the apparatus include all modifications and alterations from the disclosed design falling within the spirit or scope of the appended claims.

We claim:

1. An injection molding apparatus for manufacturing products containing elastomeric material within single cavity molds, said apparatus comprising,
   a modular frame supporting an injection molding operation station including an injector assembly having a pressure sensitive nozzle assembly, the injector assembly engaged with an extruder assembly at a check valve assembly, and a mold servicer assembly for vertical lifting and lowering of sections of single cavity molds for assembly and disassembly of single cavity molds,
   a robotic assembly positioned for inserting and removing products or product components from positions within said injection molding apparatus; and
   a rotating table having a plurality of positions along the periphery of the rotating table to move a single cavity mold into and out of engagement with the injection molding operation station, each position supporting a clamping assembly for clamping a single cavity mold.

2. The injection molding apparatus of claim 1 wherein the rotating table has a substantially circular configuration.

3. The injection molding apparatus of claim 2 wherein operation of the injector assembly, nozzle assembly, extruder assembly, robotic assembly, rotating table and clamping assemblies are all computer controlled by a central programmable controller.

4. The injection molding apparatus of claim 1 wherein the robotic assembly is positioned at a corner of the modular frame to permit use of the robotic assembly at one or more adjacent injection molding systems.

5. The injection molding apparatus of claim 1 wherein the modular frame includes sidewalls which are aluminum castings.

6. The injection molding apparatus of claim 1 wherein said injector assembly and extruder assembly are configured to enable injection pressures sufficient to initiate curing of the product.

7. The injection molding apparatus of claim 1 wherein said mold servicer assembly includes a bronze central drive cam for improved wear resistance.

8. The apparatus of claim 1 wherein the injector assembly and the extruder assembly are supported at an angle of between 20 and 25 degrees with respect to a central axis between sidewalls of the modular frame.

9. An injection molding apparatus for manufacturing products containing elastomeric material within single cavity molds, said apparatus comprising,
   a modular frame supporting an injection molding operation station including an injector assembly having a pressure sensitive nozzle assembly, the injector assembly engaged with an extruder assembly at a check valve assembly, and a mold servicer assembly for assembly and disassembly of single cavity molds, the mold servicer assembly having a central drive cam for vertical lifting and lowering of sections of single cavity molds,
   a robotic assembly positioned for inserting and removing products or product components from positions within said injection molding apparatus;
   a substantially circular rotating table having a plurality of positions along the periphery of the rotating table to move a single cavity mold into and out of engagement with the injection molding operation station, each position supporting a clamping assembly for clamping a single cavity mold; and
   the injector assembly, nozzle assembly, extruder assembly, robotic assembly, rotating table and clamping assemblies are all computer controlled by a central programmable controller.

10. The injection molding apparatus of claim 9 wherein the robotic assembly is positioned at a corner of the modular frame to permit use of the robotic assembly at one or more adjacent injection molding systems.

11. The injection molding apparatus of claim 9 wherein said mold servicer assembly central drive cam is bronze for improved wear resistance.

* * * * *